United States Patent
Chakrabarti et al.

(10) Patent No.: US 6,189,005 B1
(45) Date of Patent: Feb. 13, 2001

(54) SYSTEM AND METHOD FOR MINING SURPRISING TEMPORAL PATTERNS

(75) Inventors: Soumen Chakrabarti, San Jose; Byron Edward Dom, Los Gatos; Sunita Sarawagi, San Jose, all of CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/138,062

(22) Filed: Aug. 21, 1998

(51) Int. Cl.[7] .................................................... G06F 17/30
(52) U.S. Cl. ...................... 707/6; 707/1; 707/7; 707/101; 707/201
(58) Field of Search ................................ 707/1, 6, 7, 10, 707/101, 204, 3, 104

(56) References Cited

U.S. PATENT DOCUMENTS

| 5,615,341 |   | 3/1997  | Agrawal et al. ...................... 395/210 |
| 5,664,171 |   | 9/1997  | Agrawal et al. ...................... 395/602 |
| 5,664,174 |   | 9/1997  | Agrawal et al. ...................... 395/606 |
| 5,668,988 | * | 9/1997  | Chen et al. ........................... 707/102 |
| 5,724,573 |   | 3/1998  | Agrawal et al. ...................... 395/606 |
| 5,742,811 | * | 4/1998  | Agrawal et al. .......................... 707/1 |
| 5,884,305 | * | 3/1999  | Kleinberg et al. ........................ 707/6 |
| 6,006,223 | * | 12/1999 | Agrawal et al. .......................... 707/5 |
| 6,014,647 | * | 1/2000  | Nizzari et al. .......................... 705/39 |

OTHER PUBLICATIONS

IEEE publication, "An Architecture fro Temporal Data Mining" by Xiaodong Chen et al., Dept. of Mathematics, Manchester, MI 5GD England, p. 8/1–8/4, Jan. 1998.*

"Quest Technologies", IBM Data Mining Research, http://www.almaden.ibm.com/cs/quest/technologies.html, pp. 1–3, no date.

"Statistical Pattern Recogntion: A Review" by Anil K. Jain et al, IEEE Transactions of Pattern Analysis and Machine Intelligence, vol. 22, No. 1, pp. 4–37, Jan. 2000.*

"A Primer for Understanding and Applying Data Mining" by Bhavani Thuraisingham, IT Pro, pp. 28–31, Jan. 2000.*

R. Agrawal et al, "Mining Association Rules Between Sets of Items In Large Databases", PROC 1993 ACM SIGMOD Conference, pp. 207–216, 1993.

* cited by examiner

Primary Examiner—Wayne Amsbury
Assistant Examiner—Diane D. Mizrahi
(74) Attorney, Agent, or Firm—Khanh Q. Tran, Esq.

(57) ABSTRACT

A system and method for data mining is provided in which temporal patterns of itemsets in transactions having unexpected support values are identified. A surprising temporal pattern is an itemset whose support changes over time. The method may use a minimum description length formulation to discover these surprising temporal patterns.

44 Claims, 10 Drawing Sheets

SYSTEM AND METHOD FOR MINING SURPRISING TEMPORAL PATTERNS

BACKGROUND OF THE INVENTION

1. Field of the Invention

This invention relates generally to data processing, and more particularly to "computer database mining" in which association rules which characterize a relationship between significant transactions, that are recorded in a database, are identified. In particular, the invention concerns the identification (i.e., mining) of itemsets or rules in a large database of transactions that are selected not because they are frequent, but because they show surprising patterns along time.

2. Description of the Related Art

Customer purchasing habits can provide invaluable marketing information for a wide variety of applications. For example, retailers can create more effective store displays and more effectively control inventory that otherwise would be possible if they know that, given a consumer's purchase of a first set of items (a first itemset), the same consumer can be expected, with some degree of likelihood of occurrence, to purchase a particular second set of items (a second itemset) along with the first set of items. In other words, it is helpful from a marketing standpoint to know the association between the first itemset and the second itemset (the association rule) in a transaction. For example, it would be desirable for a retailer of automotive parts and supplies to be aware of an association rule expressing the fact that 90% of the consumers who purchase automobile batteries and battery cables (the first itemset) also purchase post brushes and battery post cleansers (referred to as the "consequent" in the terminology of the invention).

Advertisers too may benefit from a thorough knowledge of such consumer purchasing tendencies since they may change their advertising based upon the information mined from the database. In addition, catalog companies may be able to conduct more effective mass mailings if they know the tendencies of consumers to purchase particular sets of items with other set of items. It is understood, however, that although this discussion focuses on the marketing applications of the invention, database mining and, hence, the principles of the invention, are useful in many other areas, such as business or science, for example.

Until recently, building large detailed databases that could chronicle thousands or even millions of consumer transactions was impractical. In addition, the derivation of useful information from these large databases (i.e., mining the databases) was highly impractical due to the large amounts of data in the database which required enormous amount of computer processing time to analyze. Consequently, in the past, marketing and advertising strategies have been based upon anecdotal evidence of purchasing habits, if any at all, and thus have been susceptible to inefficiencies in consumer targeting that have been difficult if not impossible to overcome.

Modem technology, such as larger, faster storage systems and faster microprocessors, have permitted the building of large databases of consumer transactions. In addition, the bar-code reader may almost instantaneously read so called basket data (i.e., when a particular item from a particular lot was purchased by a consumer, how many items the consumer purchased, and so on) so that the basket data may be stored. In addition, when the purchase is made with, for example, a credit card, the identity of the purchaser is also known and may be recorded along with the basket data.

However, building a transactions database is only part of the challenge. Another important part of the marketing is mining the database for useful information, such as the association rules. The database mining, however, becomes problematic as the size of the database expands into the gigabyte or terabyte size.

Not surprisingly, many methods have been developed for mining these large databases. The problem of mining association rules from large databases was first introduced in 1993 at the ACM SIGMOD Conference of Management of Data in a paper entitled, "Mining Association Rules Between Sets of Items in a Large Database" by Rakesh Agrawal, Tomasz Imielinski and Arun Swami. In general, the input, from which association rules are mined, consists of a set of transactions where each transaction contains a set of literals (i.e., items). An example of an association rule is that 30% of the transactions that contain beer and potato chips also contain diapers and that 2% of all transactions contains all of these items. In this example, 30% is the confidence of the association rule and 2% is the support of the rule. The typical problem is to find all of the association rules that satisfy user-specified minimum support and confidence constraints. As described above, this mining of association rules may be useful, for example, to such applications as market basket analysis, cross-marketing, catalog design, loss-leader analysis, fraud detection, health insurance, medical research and telecommunications diagnosis.

To better understand the context of the invention, a brief overview of typical association rules and their derivation is now provided. First let $I=\{1_1, 1_2, \ldots 1_m\}$ be a set of literals called items. Let D be a set of transactions, where each transaction T is a set of items such that $T \subseteq I$. Therefore, a transaction T contains a set A of some items in I if $A \Rightarrow T$. An association rule is an implication of the form $A \subseteq B$, where $A \subset I$, $B \subset I$, and $A \cap B = \emptyset$. The rule $A \Rightarrow B$ holds true in the transaction set D with a confidence "c" if c % of transaction in D that contain A also contain B (i.e., the confidence in the conditional probability $p(B|A)$). The rule $A \Rightarrow B$ has support "s" in the transaction set D if s % of the transactions in D contain $A \cup B$ (i.e., the support is the probability of the intersection of the events). Given a set of transactions D, the computational task of a typical mining system is to generate all associations rules that have a support value and a confidence value greater than a user-specified minimum support value and minimum confidence value. Because a user of the system must estimate and select an appropriate confidence level and an appropriate support level, the typical association rule mining system may generate too few or too many association rules depending on the confidence and support values that are chosen. Therefore, the effectiveness of the typical association rule mining system is substantially dependent upon the user selecting the appropriate values for the confidence and support variables.

key limitation of existing itemset and rule mining systems are that they look for prevalent patterns, not surprising ones. These broad regularities (i.e., prevalent patterns) are already known to people who understand the particular domain (i.e., a domain expert). What these experts not want from large data warehouses are surprising, novel and non-trivial patterns which can indicate unexpected phenomena. Thus, there is a broad consensus that the success of a data mining system will depend critically on the ability to go beyond obvious patterns and find novel and useful patterns. Otherwise, as described above, the results of data mining will often be a large number of association rules which lack novelty, making it overwhelming difficult and unrewarding for the analyst to sift through them. In addition, a domain expert who is already familiar with the application domain is very unlikely to be satisfied with merely the prevalent patterns, because (1) presumably the company he works for is already exploiting them to the extent possible (because they already know about them) and (2) the competition also already knows about these patterns. Therefore, for data mining to be useful, it is desirable to discover the surprising patterns.

There are some systems and methods for discovering sequential patterns in transactions. These sequential pattern discovery systems discover a sequence of itemsets that are disjoint and a sequential pattern is characterized as interesting as long as its support/confidence, as described above, taken over all data sequences goes over a user-specified threshold. An example of a sequential pattern is that, "80% of the time, within a week of renting Star Wars, the customer also rents "Return of the Jedi". A sequential pattern discovery system does not discover itemsets whose support has changed over time. It is desirable, however, to be able to discover surprising temporal patterns (i.e., an itemset whose support changes over time) in transactions. This is quite distinct from temporal patterns as will become apparent in what follows.

There are also conventional systems which determine a local estimate of support in which the local estimate of support needs to have a time window specified by the user. The problem is that a small window may lead to poor statistical confidence of estimated parameters while a large window may skip over a surprising segment and average it into a larger, uninteresting one. Thus, for this conventional system, the selection by the user of window size, smoothing function, test statistic and surprise threshold are all critical choices best made by one highly experienced in the particular domain. The selection of variables is also critical for conventional approaches based on frequency transformations. It is desirable, however, to avoid any need for variable tuning and instead base the analysis on only one assumed property that the baskets of market data are independently drawn from a possibly drifting distribution.

A simple measure of surprise is the extent that an itemset departs from a model which may be estimated using standard multivariate time series analysis. Unfortunately, such simple estimation involves models, smoothing windows and parameters whose optimal choices can vary dramatically from one application to another and therefore do not provide a good measure of the surprise. Therefore, a system and method for discovering surprising temporal patterns which avoids these and other problems of the conventional systems is desirable and it is to this end that the present invention is directed.

SUMMARY OF THE INVENTION

In accordance with the invention, surprising temporal patterns are discovered in a time-stamped sequence of transactions wherein each transaction consists of a set of items (an itemset). A pattern is a set of items (an itemset) and the support for a pattern, over a time interval, is the fraction of the transactions over that time interval containing the pattern. A surprising pattern is a pattern whose support is higher than statistically expectations and a surprising temporal pattern is one where the surprise (i.e., support) change over time in a statistically significant manner. An example of a surprising temporal pattern is that, "there was a known large positive correlation between Pepsi and Fritos is shopping baskets until May 2028, and after May 2028, the correlation Coke and Fritos increased while the Pepsi and Fritos correlation dropped". The discovery of only surprising temporal patterns eliminates obvious patterns from the results of an association rule discovery.

In contrast to the simple surprise model described above, a precise characterization of surprise is provided which is based on the number of bits into which a sequence of items may be encoded under a carefully chosen coding scheme. In this inventive encoding scheme, it is inexpensive (i.e., requires few bits) to encode sequences of itemsets that have steady, hence likely to be well-known, correlation between items. Conversely, a sequence with a large code length (i.e., a large number of bits) hints at a possibly surprising correlation. The method also has the desirable property that the score of a set of items is offset by anything surprising that the user may already know from the marginal distribution of any proper subset. In accordance with the invention, no parameters, such as support, confidence, or a smoothing window size, needs to be estimated or specified by the user which increases the accuracy of the system by eliminating the guess work normally associated with data mining.

The method in accordance with the invention was tested with real-life market basket data and the method successfully rejected a large number of frequent sets of items (itemsets) that bore obvious and steady complementary relations to each other, such as cereal and milk being bought together. Instead, the method located itemsets that showed statistically strong fluctuations in correlation over time. These items had no obviously complementary roles.

In accordance with the invention, a minimum description length (MDL) formulation may be used to measure the change in the surprise over time. In particular, the description length is larger for patterns that change over time as opposed to patterns which remain more or less constant over time. In accordance with one aspect of the invention, an unconstrained description length for a itemset is discovered by modeling the support profile as a sequence of fixed length segments. Next, an optimal method for discovering the length of these segments may be used in which a reduction of the description length to the shortest path in a weighted graph may be used. Next, a constrained description length is determined by restricting the model to have the same value of surprise over all of the segments. The difference between the length of the unconstrained and the constrained description length corresponds to the surprise of an itemset over time.

Thus, in accordance with one aspect of the invention, a method for identifying unexpected temporal patterns in a dataset containing a plurality of transactions is provided in which each transaction contains one or more items with a time-stamp and the one or more items are grouped into itemsets containing a pattern of items. The method generates one or more support values at predetermined times for each pattern wherein each support value indicates a portion of the transactions in the dataset containing each such pattern at a predetermined time. Next, the method selects unexpected patterns from the dataset which have a support value at a predetermined time that is higher than a predetermined threshold value and then identifies an unexpected temporal pattern from the selected unexpected patterns, the unexpected temporal pattern having support values over a predetermined time period which change more than a second predetermined threshold value. A system for implementing such a method is also described.

In accordance with another aspect of the invention, a method for identifying unexpected temporal patterns in a dataset is provided in which the dataset contains a plurality of transactions and each transaction contains one or more time-stamped items. The one or more items are grouped into itemsets having a pattern of items. The method generates a support value at a predetermined time for each pattern indicating the portion of the transactions in the dataset containing the pattern of items at the predetermined time. The method then selects candidate patterns from the dataset based on the variations in the support value of the pattern over a predetermined time period and generates an unconstrained description length for each candidate pattern, the unconstrained description length corresponding to a value indicating changes in the support of the pattern over the predetermined time period. The method next generates a constrained description length for each candidate pattern, the constrained description length corresponding to a compressed value indicating the changes in the support of the pattern over the predetermined time period. The method then identifies patterns, based on a comparison of the unconstrained description length and the constrained description length, which have a unexpected support value which changes during the predetermined time period to generate unexpected temporal patterns.

DETAILED DESCRIPTION OF A PREFERRED EMBODIMENT

Figure 1:
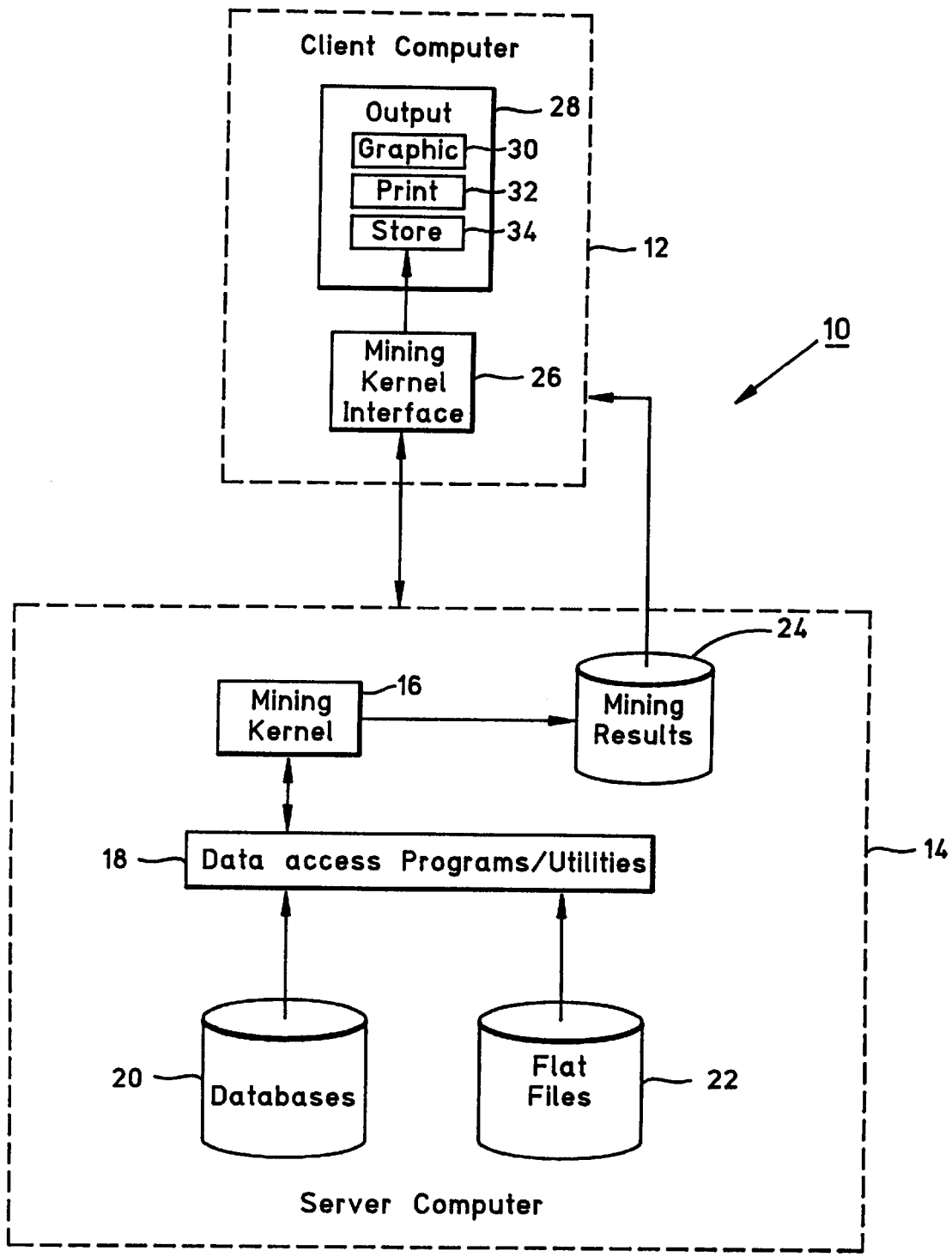
FIG. 1 is a functional block diagram illustrating a system that may be used for discovering surprising temporal patterns in accordance with the invention.

FIG. 1 illustrates a computer system 10 which may be used for mining databases and in particular may be used for discovering predictive association rules in accordance with the invention. In the particular computer architecture shown, the system 10 may include one or more digital processing apparatus, such as a client computer 12 and a server computer 14. In a preferred embodiment, the server computer may be a mainframe computer made by IBM Corp. of Armonk, N.Y., and use a multitasking operating system sold as that under the trademark of MVS. The server computer 14 may also be a Unix computer, an OS/2 server, a Windows NT server or an IBM RS/6000 250 workstation with 128 Mb of main memory using the AIX 3.2.5 operating system. The server computer 14 may include a database system, such as DB2 or ORACLE or it may have data on files on some other data storage medium, such as a disk (e.g., a 2 GB SCSI 3.5" drive or a tape. As will be apparent, other architectures may also be used. For example, the functions of the client computer 12 may be incorporated into the server computer 14, and vice versa.

As shown, the operating system of the server computer 14 may include a surprising temporal pattern identifier kernel 16 which may be executed by a processor within the server computer 14 as a series of computer-executable instructions. These computer-executable instructions may reside, for example, in the RAM of the server computer 14. Alternatively, the instructions may be contained on a data storage device with a computer readable medium, such as a computer diskette 15 shown in FIG. 2. The instructions may also be stored on a DASD array, a magnetic tape, a conventional hard disk drive, electronic read-only memory, an optical storage device, or any other appropriate data storage device. In an illustrative embodiment of the invention, the computer-executable instructions may be lines of compiled C++ language code.

Figure 2:
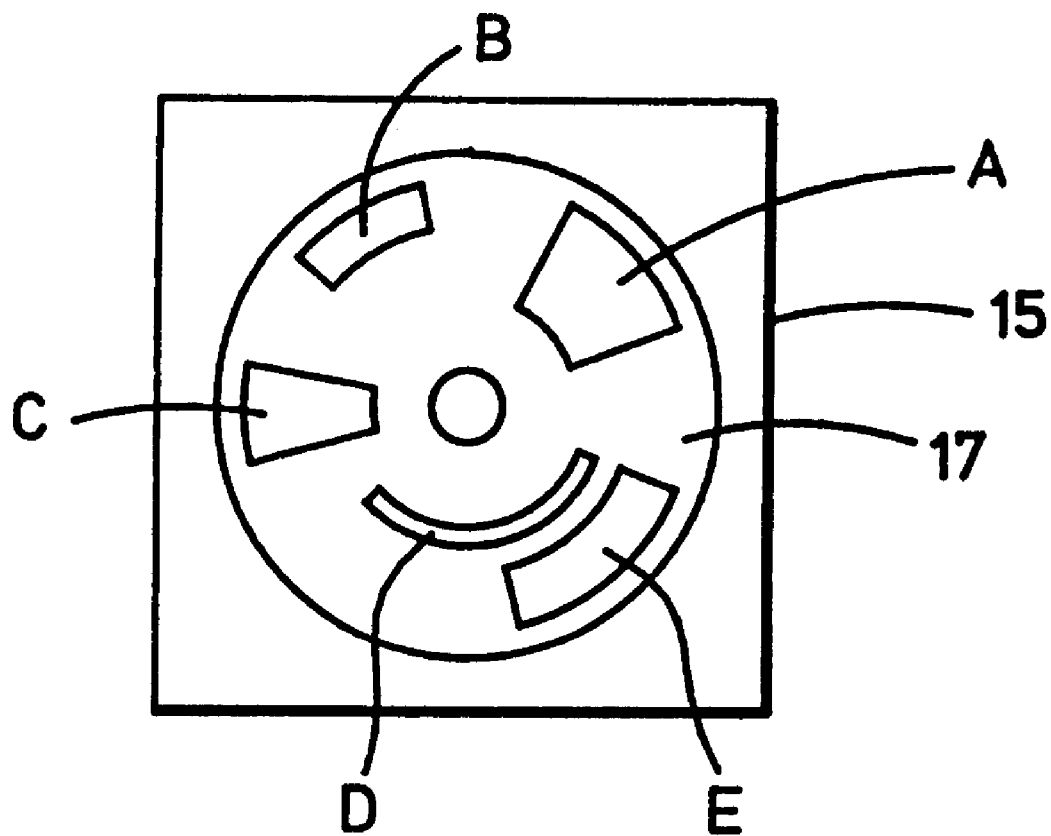
FIG. 2 illustrates a machine component embodying the invention, with portions cut away for illustration.

FIGS. 3–7 illustrate the structure of such instructions as embodied in a computer program. Those skilled in the art will appreciate that FIGS. 3–7 illustrate the structures of the computer program code elements that function according to this invention. Preferably, the invention is practiced in its essential embodiment by a machine component that renders the computer program code elements in a form that instructs a digital processing apparatus (i.e., a computer) to perform a sequence of functional steps corresponding to those shown in the Figures. The machine component is shown in FIG. 2 as a combination of program code elements A–E in computer readable form that are embodied in a computer-usable data medium 17, on the computer diskette 15. As mentioned above, however, such media may also be found in semiconductor devices, on magnetic tape and on optical disks.

Each of the code elements A–E is for directing a digital processing apparatus to facilitate some portion of the method by which this invention is practiced. Even when no single code element A–E includes the complete method, two or more of the code elements together may comprise all of the program means necessary to facilitate the practice of the invention.

FIG. 1 shows that, through appropriate data access programs and utilities 18, the identifier kernel 16 accesses one or more databases 20 and/or flat files (i.e., text files) 22 which contain data about one or more consumer transactions. After executing the steps described below, the identifier kernel 16 outputs surprising temporal patterns. These outputs may be stored in a results repository 24, which may be accessed by the client computer 12.

FIG. 1 also illustrates that the client computer 12 may include as identifier kernel interface 26 which, like the identifier kernel 16, may be implemented is suitable computer code. Among other things, the interface functions as an input mechanism for establishing certain variables, including a minimum confidence and support value and the other predetermined/user-defined input parameters disclosed below. Further, the client computer 12 preferably includes an output module 28 for outputting/displaying the results stored in the results repository 24 on a graphical display 30, to a printing mechanism 32 or to a data storage medium 34. Now, the functional details of the surprising temporal pattern identifier 16 will be described.

In one embodiment, the identifier 16 may identify surprising temporal patterns using a minimum description length approach. The surprising temporal pattern identifier have many advantages such as it may lead to improved data mining accuracy and data understanding. In addition, data collected over long intervals are generated by processes with drifting parameters and a single model over all time may lead to poor models and/or poor predictive accuracy. In addition, the large volume of data available for data mining hurts conventional systems which use the same model over all time. In accordance with the invention, a model having an optimal segments of time is generated in order to avoid this problem. The surprising temporal pattern identifier may also be used to segment data for supervised learning along time to discover interesting changes in decision boundaries as time passes. Now, a method for discovering surprising temporal patterns in accordance with the invention will be described.

Figure 3:
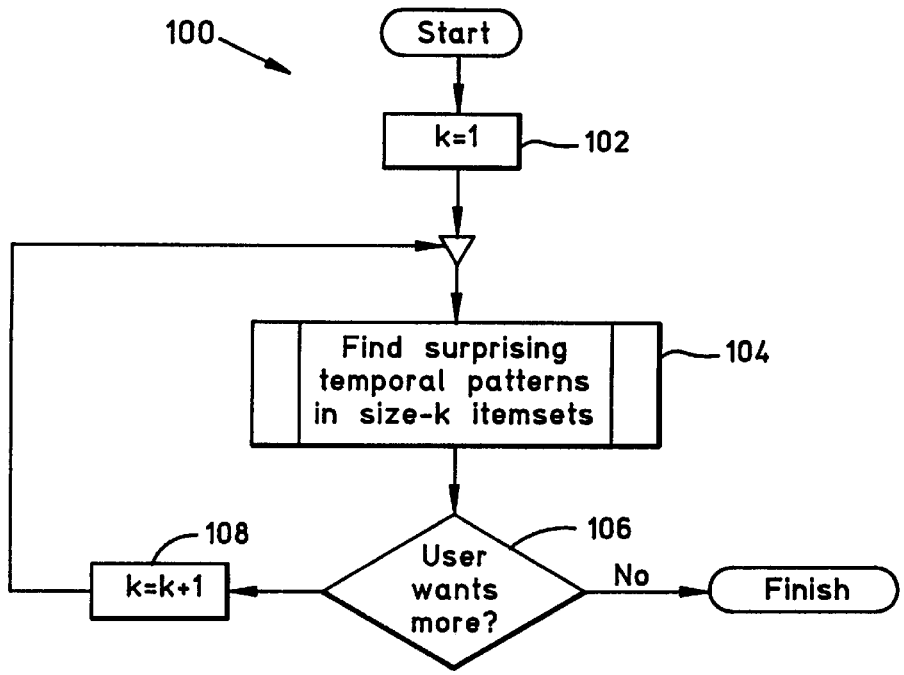
FIG. 3 is a flowchart of an overall method for discovering surprising temporal patterns in accordance with the invention.

FIG. 3 is a flowchart of an overall method 100 for discovering surprising temporal patterns in accordance with the invention. This method 100 may operate on a dataset or database containing one or more transactions in which each transaction contains one or more items. In the example of market basket data, the items may be items purchased by a consumer at a grocery store and each transaction may be all of the grocery items purchased by a particular individual during a particular trip to the grocery store. For purposes of this method, the database or dataset may contain a plurality of transactions over some time period in which each transaction is time-stamped. In step 102, the database or dataset is analyzed to generate itemsets (i.e., a set of items which appear together in one or more transactions) over the time period of length, k, equal to 1 and then each itemset is analyzed to generate a support value. As described above, a support value for an itemset indicates the total number of transactions in the database which contain all of the items in the itemset. More details about the determination of these well known support values for an itemset is disclosed in U.S. Pat. No. 5,615,341 to Agrawal et al., U.S. Pat. No. 5,664,171 to Agrawal et al., U.S. Pat. No. 5,664,174 to Agrawal et al. and U.S. Pat. No. 5,724,573 to Agrawal et al. which are assigned to the assignee of this invention and are incorporated herein by reference, A key aspect of the invention is to determine the timespan over which the support should be determined as described in more detail below with reference to FIG. 7.

Once the support values for the itemsets have been determined, in step 104, any surprising temporal pattern within the k=1 itemsets are selected. A pattern is an itemset (i.e., a set of items) which is repeated in a predetermined number of transaction in the database. A surprising pattern is a pattern which has a support value that is higher than statistically expected. The surprising patterns are selected in order to reduce (i.e., prune) the total number of itemsets which must be processed in accordance with the invention. This process for selecting a surprising pattern (i.e., pruning the itemsets) will be described in more detail below. A surprising temporal pattern is a surprising pattern which has a surprise (i.e., an unexpected support value) which changes over time. In one embodiment of the invention, a minimum description length formulation may be used to determine the change in the surprise over time in accordance with the invention. In particular, a description length may be determined, based on a model, and a longer description length indicates a pattern which changes over time while a shorter description length indicates a pattern which does not change over time. A more detailed description of the determination of a surprising temporal pattern will be described below.

Once the surprising temporal patterns have been identified, the system determines, in step 106, if the user of the system wants to find additional surprising temporal patterns. If the user does not want any more surprising temporal patterns, the method is completed. If the user wants more surprising temporal patterns to be identified, the value of k is increased by one in step 108 and the method loops back to step 104 in which surprising temporal patterns in itemsets containing two items is determined. In this manner, surprising temporal patterns in itemsets having 1 to n items is determined by the method. As described above, because this method does not require a user-specified support value or confidence value, the method is more accurate and does not require the user to tune the method by adjusting those variables. In addition, since only surprising temporal patterns are identified by the method, fewer association rules are identifier and the association rules which are identified are generally more interesting to the user of the system since these are the association rules which usually are not identified by conventional data mining systems and therefore, probably not known by other competitors in the industry. Now, more details about the basis for the method and more details about each of the steps of the method will be provided.

To understand the invention better, it is necessary to understand the basis for the method including the modeling of the data. In this particular case, some of the basis for this method arises from information theory. In particular, the underlying premise is that data which can be described using very few encoding bits is simple and predictable, and hence less likely to be found interesting or surprising. A body of mathematics, known as Information Theory, gives us a general way to construct a model for given data while regarding it as a compression problem (i.e., it is desirable to compress the data as much as possible and compression takes advantage of repeating patterns in the data so that a high level of compression indicates a predictable behavior which is not surprising). In this example, imagine a sender, S, wishing to send some data, $\vec{x}$ to a receiver, R, using as few bits as possible (i.e., compressing the data). A suitable model, M, is first transmitted, consuming L(M) bits. Typically M is chosen from a class of models and associated parameter space that S and R have agreed upon in advance. For example, S may transmit the mean and variance of a normal distribution to R, if there is reason to believe that the data follows a normal distribution.

Next, the data is encoded suitably and sent to R, using what we denote as $L(\vec{x}|M)$ bits of information. Because R knows M, the data compression may be greatly enhanced, i.e., $L(\vec{x}|M)$ may be much smaller than $L(\vec{x})$. Specifically, assume that $Pr(\vec{x}|M)$ is the probability of a specific data value $\vec{x}$ given the model M. Then, the well-known Shannon's classical Information Theorem states that the data can be encoded in $L(\vec{x}|M)=-\log \Pr(\vec{x}|M)$ bits. In this example, S and R are motivated to pick a coding scheme that minimizes $L(M)+L(\vec{x}|M)$. The initial choice of the parameters values of M are usually made to maximize $\Pr(\vec{x}|M)$. The well-known, classical Minimum Description Length (MDL) principle argues that this will generally lead to models that capture exactly the regularities in the data and avoid over-fitting to random deviations.

As an example, suppose we are given two bit strings of identical length and asked to identify the "more complex" one, without any further information. Then, a reasonable approach would be to compress both of the strings using the well-known Lempel-Ziv (LZ) compression scheme and select the larger of the two compressed strings as the more complex string. The LZ compression yields asymptotically optimal compression, but does not produce a model-based explanation of the data. If the data were a finite sequence of floating point numbers drawn from a normal distribution, LZ could be a poor choice In an embodiment of the invention, the raw data in the database is a sequence, $\chi_\tau$, of market baskets, each basket being a set of items, ordered by time, $\tau$. Let us focus on a fixed itemset with k items. Then, each basket contains one of the $2^k$ possible subsets of the k items in it. Thus, if we are reasoning about k items, we can regard each basket to be the outcome of tossing a $2^k$ sided coin (better called a die) with the presence or absence of the i-th item encoded in the i-th bit of the toss outcome written as a k-bit number between 0 and $2^k-1$.

First, consider the case where a sequence of tosses (i.e., baskets) are generated from one coin. Our model, M, associates with each face of the coin a probability. For two items, the model M has four terms $p_{00}$, $p_{01}$, $p_{10}$, and $p_{11}$ where $p_{00}$ denotes the probability that both the items are absent, $p_{01}$ denotes the probability that the first one is absent but the second is present and so on. This notation generalizes to items in the obvious way.

To capture drift (i.e., changes in the data over time) in the process underlying the baskets, we assume a random process that generates the data in which the process has a set of coins with various face probabilities, unknown to us, the observers. It picks some coin arbitrarily and then tosses it for an arbitrary number of trials before moving on to another coin. Each coin thus defines a segment of time where the itemset distribution is stationary. We can observe only the sequence of outcomes. For simplicity and efficiency, we pick stationary models within each segment, not ones whose parameters gradually drift with time. This is in the same spirit as the simple decision boundaries used by classification and regression trees. More complicated segment models can be used, but at larger complexity.

To summarize, in our model, M, we represent a k-itemset sequence as a set of segments where each segment is generated from a $2^k$ sided coin. The model cost, $L(M)$, has two parts: 1) the parameter cost which for each segment includes the cost of encoding the coin biases like $p_{00}$ and $p_{01}$; and 2) the segmentation cost which includes the cost of encoding the number of segments and the boundary of each segment. The data cost is estimated by applying Shannon's theorem to each segment and summing up the log probabilities (since the segments are assumed to be independent). The model, M, as described above, may be used as a basis for defining the interest measure of an itemset. The method for determining the interest in an itemset will now be described with reference to FIG. 4.

Figure 4:
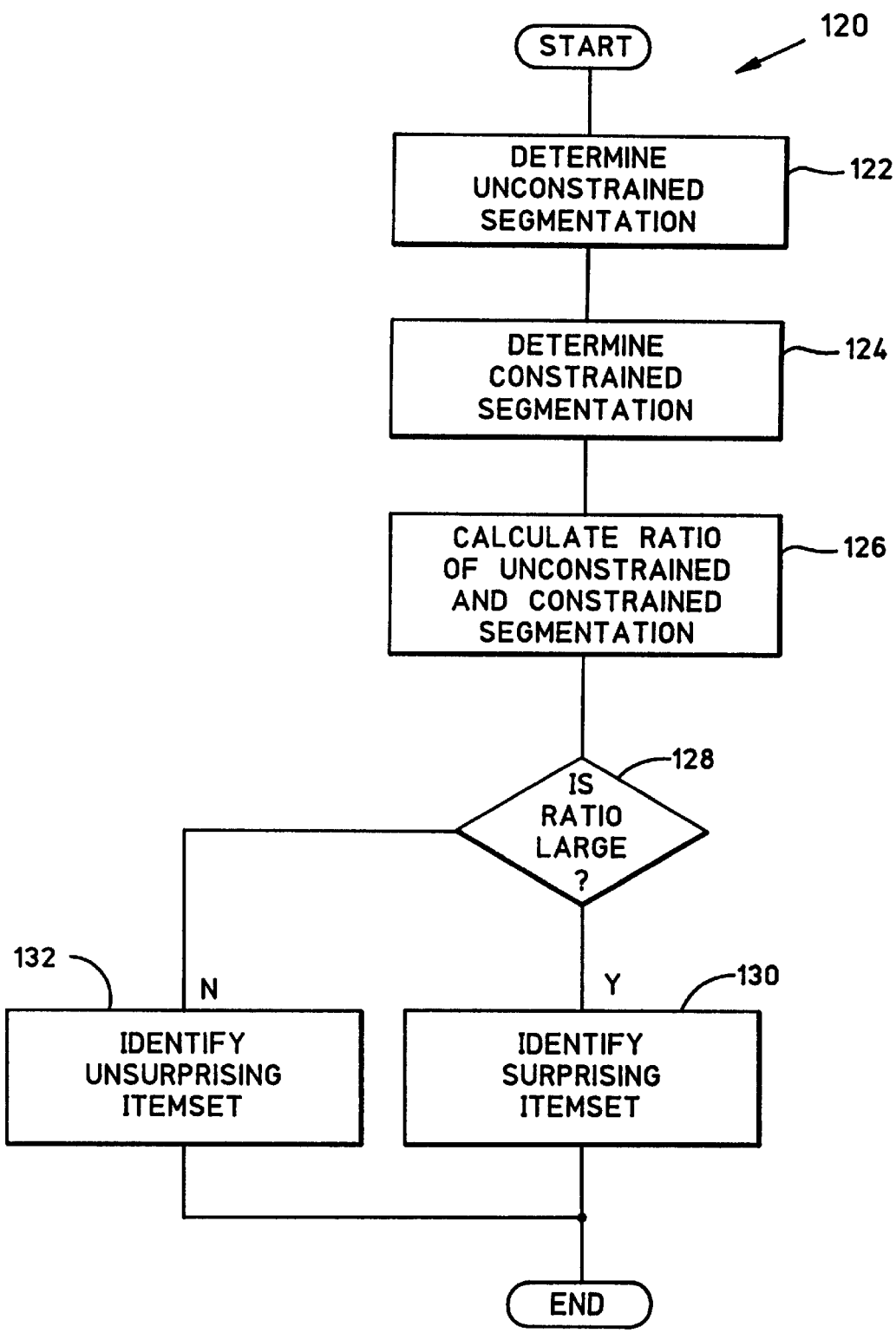
FIG. 4 is a flowchart illustrating a method for determining the surprise (an unexpected support for the itemset) of an itemset and for identifying surprising itemsets in accordance with the invention.

FIG. 4 is a flowchart illustrating a method 120 for determining the surprise (an unexpected support for the itemset) of an itemset and for identifying surprising itemsets in accordance with the invention. The method for identifying surprising itemsets begins at step 122 in which an unconstrained segmentation is determined for the itemset. In other words, first a best segmentation of an itemset using the model described above is determined. The unconstrained segmentation model does not provide the best compression because it ignores two factors. First, when modeling a k-itemset, a user's knowledge of (k-1) itemsets is not exploited. Second, even when the individual parameters of the model change from segment to segment, the relationship between the parameters may remain constant over time. More details about the unconstrained segmentation will be described below.

Next in step 124, a constrained segmentation model for each itemset is determined in which the two factors described above are incorporated into the model. More details about determining the constrained segmentation will be described below. In step 126, the ratio of the length of the unconstrained segmentation to the length of the constrained segmentation is determined. In step 128, the system determines whether the ratio determined above is larger than a predetermined threshold value. If the difference or ratio between the constrained and the unconstrained (reference) segmentation is large, then the itemset is identified as a surprising itemset in step 130. If the ratio between the constrained and unconstrained segmentation is not sufficiently large, then the itemset is identified as unsurprising in step 132. Thus, for each itemset, the surprise of the itemset is determined as described above. Now, more details about the identification of a surprising itemset will be described.

To understand segmentation more fully, a simpler case of segmenting a single item is described and then segmentation for additional items will be described. If a store has only one item, each basket can be thought of as the outcome of a single (2-sided) coin toss in which heads may correspond to the item being purchased and tails corresponds to the item not being purchased. Given a sequence of T tosses, the process for determining the segmentation is somewhat difficult. In particular, at one extreme, we can assume there are T coins, each with bias 0 or 1, and given this model, the data fits perfectly; i.e., the probability of generating the given sequence is 1. At the other extreme we can posit only one coin and under this model, the probability of generating the given sequence may be very low if indeed the sequence was generated from many coins with diverse biases. It is possible, as is done in conventional systems, to try estimating biases over windows of trials and then merge or split them. The danger is in picking these windows. A number of small windows will not give bias estimates with sufficient statistical confidence, and large windows may skip over a very interesting but small segment where the bias was remarkably different. It turns out that there is a notion of the "correct" segmentation of the given sequence, defined in terms of MDL defined earlier, and a method for determining the segmentation using the MDL will now be described.

To determine the segmentation, assume as above that a sender S wants to send a sequence to receiver R in as few bit as possible. First, the sender S first sends the description of a model M for the coins. In our case, this consists of the number m of coins or segments, and a sequence of m coin biases and the segment boundary (the first segment at position 0 and the last ends at position T). The segmentation and coin parameters that minimizes $L(M)+L(\vec{x}|M)$, as described above can be computed in $O(T^2)$ time as shown below.

First, a graph is constructed with (T+1) nodes, and directed edges (i,j) for every 0<i<j< T. There may be t(i,j) trials between i and j, with $h_1(i,j)$ heads and $h_0(i,j)$ tails (these observed values are collectively called $\vec{x}$ above). Each edge (i,j) is assigned a cost, c(i,j), which represents the model (i.e., the sum of the parameter and the segmentation costs) and data cost for encoding the tosses between i(excluded) and j(included). Calculating this edge cost involves estimating the model parameters, finding the data encoding cost, finding the parameter encoding cost, finding the segmentation cost and finding the shortest path as will now be described.

First it is necessary to find the model parameters $p_1(i,j)$ and $p_0(i,j)$. The values of these parameters that optimize the data fit are their maximum likelihood (ML) estimates (To avoid problems with parameters approaching zero or one we use Laplace's rule, but we ignore this detail in our description) calculated from the data as: $p_1(i,j)=h_1(i,j)/t(i,j)$, and $p_0(i,j)=1-p_1(i,j)$. Then, we use the above parameters to calculate the data encoding cost for segment (i,j) (using Shannon's theorem)as:

$$L(x|M) = -\log p_1^{h_1} p_0^{h_0} = -\Sigma_r h_r \log p_r \quad (1)$$

where each parameter is over the segment (i,j).

Next, we find the parameter encoding cost. We need to transmit $p_1(i,j)$ (or $p_0(i,j)$ because knowing either one is enough). Note that the maximum likelihood estimate for $p_1(i,j)$ can take only one of (t(i,j)+1) values, so we need to send only about log t(i,j) bits (although the parameters are real numbers). This is just the encoding for the boundaries of each segment (i,j), or the number j itself, costing us log T bits for each of the m segments. (Actually, for m coins we just need log $$\binom{T-1}{m-1}$$

but this is very close to m logT for m<<T.)

Finally, we find the shortest path from node 0 to node T in $O(|E|+|V|\log|V|)=O(T^2)$ time. Thus, each edge of the shortest path is a segment in the optimal segmentation. The capability to find the exact optimum is important as a baseline even if the computation takes more than linear time. Below, a method for greatly reducing the computation cost in practice, while producing a segmentation of near-optimal quality will be described. Now, a method for determining the segmentation for a larger itemset will be described.

For k-itemsets, our model is a sequence generated by a $2^k$-sided coin. The same shortest path procedure as in the one-itemset case may be applied to find the best segmentation. The only difference is in the detail of computing the edge weights c(i,j) corresponding to each segment. First, the case of two items will be described. Suppose we are given a set of t>0 baskets over two items, among which $h_{00}$ have neither of the items, $h_{11}$ have both, $h_{10}$ have the first item but not the second, and $h_{01}$ have the second and not the first. These induce parameters $p_{rs}$ as before. The data encoding cost is a direct extension of the one-item case (i.e., $-\Sigma_{r,s} h_{rs} \log p_{rs}$). However, the way we estimate the model parameters $p_{rs}$ and encode their costs changes because, for the two item case, there are two models to choose from. The first model corresponds to the case where the two items are independent, in which case only two parameters, $p_1.$ and $p_{.1}$ are needed to specify the coin, the rest being calculated as $p_{11}=p_1.p_{.1}$, $p_{10}=p_1.-p_{11}$, etc. The parameter cost in this case is $\log(t+1)^2 \approx 2\log t$. The second model corresponds to when the items are dependent, in which case we need three parameters to specify the four-sided coin. The model cost is the logarithm of the number of ways in which t trials can be divided into four outcomes, $$\log\binom{t-1}{3} \approx 3\log t.$$

For both models, the maximum likelihood estimates of the required parameters is obtained from the data and then use the parameters to evaluate the data cost. The segmentation cost is also the same as in the one-item case. We evaluate the total cost for the edge (i,j) for both model types and take the smaller cost as c(i,j). Now, itemsets with more than two items are considered.

The number of possible models grows with the number of items. For 3-itemsets, depending on how the marginals are related, there are eight possibilities. The simplest case is when all two-way itemsets are independent, in which case three parameters are needed. The most general case is when all three-way marginals are correlated, in which case seven parameters are needed. Let the items be a, b, c. In between, there are three cases of the form "(a,b) independent, (b,c) independent, (a,c) dependent" and three cases of the form "(a,b) dependent, (b,c) dependent, (a,c) independent." Therefore, four parameters suffice for all six cases. Similar enumerations can be generated for larger itemsets.

The general method for calculating edge weights for any k-itemset is, for each possible model M, as follows:

1) Estimate the model parameters using the corresponding counts from the data. For example, for the independent model in the two-itemset case, we estimate $p_1.=h_1./t$ and $p_{.1}=h_{.1}/t$.

2) Estimate all the k-dimensional parameters from the model parameter calculated above. For example, for independent model in two dimensions we estimate $p_{11}=p_1.p_{.1}$, $p_{10}=p_1.-p_{11}$, etc. In general, these parameters may not always have closed form solutions for estimating them from lower dimensional probabilities.

3) Find data encoding cost using above k-dimensional parameters. This is a straight-forward generalization of the two itemset case, $-\Sigma_{r,s} h_{rs} \log p_{rs}$.

4) Find the parameter encoding cost for the independent parameters of the model. If a model has $\xi$ parameters, $\xi$ log t is often a good estimate, although in some cases further refinements are possible, as discussed below.

5) Find the segmentation cost.

6) Find total cost as the sum of the data, parameter and segmentation cost.

Once the total costs for all of the models has been determined, the model with the smallest total cost is selected and its cost is assigned to the edge. The number of models to be searched can increase exponentially with the number of dimensions. However, we can greatly reduce the number by using the following simple heuristic. If for a k-1 dimensional itemset, a particular model was found to be the best, then for a k dimensional itemset, start from that model and only consider generalizations of that model. For example, if for the two-itemset (a,b), the dependent model was found better than the independent model then for the three-itemset (a,b,c) do not consider any model in which a and b are independent.

In general, it is not always possible to get closed form formulas for this estimation. Consider, for instance the three-itemset case. Of the eight cases discussed earlier, all but one yield-closed form solutions for $\hat{p}_{111}$. For instance, when one of the item pairs (say a and b) is dependent and the other two pairs are independent we can calculate the expected value as $\hat{p}=p_{1.1}p_{.1.}$. The problem case is when all three-way atomic probabilities are correlated. In this case, there is no explicit formula for computing the expected support $\hat{p}_{111.}$ from the observed marginals. But there are simple conventional iterative procedures that converge to the maximum likelihood (ML) estimate for $\hat{p}_{111.}$. The iteration can be used even in cases where direct formulas exist; the iterative process will yield (in one iteration) the same answer as the closed form formulas when they exist. We describe an example of a classical algorithm called Bartlett's method for finding the probability of a k itemset given marginal probability of its subsets.

For simplicity we discuss Bartlett's process for three dimensions. The input consists of twelve 2-way marginals: four for each of three pairs of items namely: $p_{11.}$, $p_{10.}$, $p_{01.}$, $p_{00.}$ for item pair 1 and 2 and so on for the other two pairs. The process converges to values for all the eight 3-way probabilities $\hat{p}_{110}, \hat{p}_{101}, \ldots, \hat{p}_{000}$, so that these are the "least restrictive or maximal likelihood" estimates of the three dimensional probabilities while preserving the specified values of the 2-way marginal probabilities. That is, $p_{11.}=\hat{p}_{111}+\hat{p}_{110}$ and so on.

The process starts by first assigning a starting value of 1 to each of the eight 3-way probabilities. Then in each step of the iteration it scales the 3-way probabilities so as to come closer to the observed marginals. It repeats this process until a suitable error threshold is reached. An example of the pseudocode which implements this process is set forth below.

Initialize $\hat{p}_{ijk}=1$ for $i,j,k \in \{0,1\}$
While error between iterations is high
For each of the twelve two-way marginals update the 3-way probabilities to fit that marginal better: e.g., for $p_{01.}$ update as:

$$\hat{p}_{011} = \frac{p_{01} \cdot \hat{p}_{011}}{p_{01}}$$

and $\hat{p}_{010}=p_{01.}-\hat{p}_{011}$

Now we consider in more detail how to determine a level of surprise. In other words, how do we detect that one sequence of baskets is more interesting than another? Intuitively, we want an answer to have the following properties: 1) a k-itemset should not be found surprising simply because it has larger support than a pre-specified quantity, but because its support is significantly different from what is expected given the marginal supports of all proper subsets; and 2) in order to produce a ranking by surprise measure, the measure should reflect, in a uniform way across different itemsets with diverse absolute support, the complexity of variation of correlation along time.

To satisfy the first requirement, we need a method of calculating an expected support of an itemset from the support of its subsets. First we estimate expected support of the single items. Lacking prior knowledge of the data we can assume that all items are equally likely (prior knowledge can be easily integrated). Therefore, the expected support of each item in the data is the ratio of the average transaction length to the number of items.

For 2-itemsets, given the observed marginal supports $p_{1.}$ and $p_{.1}$ of the individual items, the best (maximum likelihood) estimate of the 2-itemset is $\hat{p}_{11}=p_{1.}p_{.1}$ derived using the assumption that the two itemsets are independent. If the actual support, $p_{11}>>\hat{p}_{11}$ then this 2-itemset is interesting. Thus, our natural choice for the measure of surprise is $$\theta = p_{1\ldots1}/\hat{p}_{1\ldots1} \quad (2)$$

For larger itemsets, we use the method discussed above to calculate the expected support from the lower dimensional marginals. For instance, for three-itemsets, if all two-way marginals are dependent we use the iterative procedure discussed earlier to calculate expected support. The above notion generalizes previous work on estimating the expected value by Brin et al that make the simplifying assumption that three-way itemsets are found interesting only when none of the three two-way marginals were dependent. Now, the segmentation for a single itemset will be described in more detail.

Recall from our scheme of compressing the data with respect to a model M chosen from a certain model class. In the unconstrained segmentation case, M could be any sequence of coins. Given two basket sequences, we can perform the unconstrained segmentation, but given these two coin sequences, which is more complex? A direct formal way of comparing the complexity of two coin sequences appears elusive. For example, a large number of unconstrained segments for a 2-itemset may not be surprising if the segmentation is always caused by one of the items and the items are always independent.

Since we assume that the analyst assumes " constant $\theta$ unless proved otherwise", we must encode the data with respect to a model M' from the restricted model class containing all possible sequences of coins in which all coins have the same $\theta$ value (say the value that is computed from data over all time). We call this the "single-$\theta$segmentation." Roughly speaking, itemsets with large code length in this model class depart from the analyst's prior expectation and are therefore interesting.

Now, consider a 2-itemset. First we take the entire data and find which of the independent or the dependent model fits the data better using the procedure described above. Call this the global model $M_g$. If $M_g$ is the independent model, the global value of $\theta$ is 1 (costing just one bit) otherwise estimate the value as:

$$\theta(0, T) = \frac{h_{11}(0, T)/T}{(h_1(0, T)/T)(h_1(0, T)/T)} \quad (3)$$

For setting up the shortest path instance, we must then assign the coding cost to edge (i,j). The segmentation and parameter costs are computed as before. To compute the data cost, we must estimate the coin face probabilities given the observed record counts $h_{00}$, $h_{01}$, $h_{10}$, $h_{11}$ (over the t records in this time range (i,j)). We calculate from these the observed marginals $\overline{p}_{.1}=h_{.1}/t$ and $\overline{p}_{1.}=h_{1.}/t$, which then give all the parameters of our coin for segment (i,j) via $\hat{p}_{11}=\theta\overline{p}_{.1}\overline{p}_{1.}$, $\hat{p}_{10}=\overline{p}_{1.}-\hat{p}_{11}$, etc. If the resulting coin is inconsistent (i.e., some face probability is not between zero and one) we declare the edge (i,j) as having infinite cost. It is easy to see that there is at least one feasible path in the shortest path problem, viz., the (0,T) path, that remains unaffected by this approximation. Below, we discuss a more elaborate exact procedure for k=2. Given this coin we estimate the probability of the observed data in this segment as $\Pr[\vec{h}|\vec{p}]=\Sigma_{r,s}h_{r,s}\log \hat{p}_{r,s}$ as before. We add the data cost to the model cost as evaluated in the various cases described above and take the minimum for the edge cost c(i,j).

The procedure remains essentially unchanged for larger itemsets. For a k-itemset, we find over all time the best model $M_g$. If $M_g$ is the complete model involving k dimensional probabilities as parameters, the expected value $\hat{p}_{1...1}(0,T)$ is computed by Bartlett's iteration using the k+1 dimensional marginals, and the global θ is then calculated as $$\theta(0, T) = \frac{h_{1...1}(0, T)/T}{\hat{p}_{1...1}(0, T)}$$

For segment (i,j), we compute observed k–1 and marginals $\bar{p}$ ... (i,j) over only the records in interval. Next we invoke the iterative algorithm on these observed marginals to obtain $\hat{p}_{1...1}$, and compute all the other marginals as discussed for the two-item case. Again, if the coin becomes inconsistent we mark the edge as infeasible; this can be looked at as a kind of approximation. If $M_g$ is not the complete model, we apply the same model $M_g$ on all the segments and compute the edge cost as in the unconstrained case. An exact solution may be calculated for the 2-itemset case and this solution will now be described.

For the important special case of 2-itemsets, we do not need the approximate above; we have an exact characterization of the code length. We envision a system with precise analysis for the k=2 case and approximations beyond. The potential difficulty with summarily discarding inconsistent coins as above is that there may exist a consistent coin satisfying the global θ constraint which does not exactly fit the observed marginals but still has a reasonably high data probability.

Therefore, we cannot compute the $\bar{p}$'s directly from observed data, but must cast this as a constrained optimization problem. Thus we want to assign consistent values to variables $p_{r,s}$: r,s ∈ {0.1} is as to obey the constraints and maximize the data probability (minimize data cost). Let the observed numbers of "heads" of the four types be $h_{r,s}$. Then, we must solve the following constrained non-linear optimization problem over unknowns $p_{r,s}$ (all other quantities are numerically known):

max $\Sigma_{r,s \in \{0,1\}} h_{r,s} \log p_{r,s}$ subject to $\{\Sigma_{r,s \in \{0,1\}} p_{r,s}=1$ and $p_{11}=\theta(p_{10}+p_{11})(p_{01}+p_{11})\}$ This can be solved using a variety of iterative techniques. We use a simple steepest ascent algorithm.

Finally we turn to the question of the optimal way of encoding the parameters. To do this we produce a particular coding scheme and argue that nothing can be better. Here is the scheme, we omit the argument for lack of space. Recall that θ is transmitted once for all segments; this is a negligible cost. For all segments, this fixed value of θ will be used. For segment (i,j), we will send two parameters. As we have noted earlier, although these are interpreted as real numbers, the model can only assume a discrete number of configurations, and we can thus send the parameters as integers. We will pick two integers $\phi_{1.}$ and $\phi_{.1}$ to send. The intent is that the receiver will compute the model as $p_{1.}=\phi_{1.}/t$, $p_{.1}=\phi_{.1}/t$, $p_{11}=\theta\phi_{1.}\phi_{.1}$, and thus know all $p_{rs}$. We have to ensure that the φ's are such that all $p_{rs}$'s are consistent, specifically, that the following hold: $p_{11} \leq p_{1.}$, $p_{11} \leq p_{.1}$, and $p_{1.}+p_{.1} \leq 1+p_{11}$. Replacing by φ's and simplifying, we get: $\phi_{1.} \leq t/\theta$, $\phi_{.1} \leq t/\theta$ and $\phi_{1.}+\phi_{.1} \leq t+\theta/t(\phi_{1.}\phi_{.1})$ apart from the standard constraints φ<t. The number of bits required to encode $\phi_{1.}$ and $\phi_{.1}$ is the log of the number of ways in which they can be chosen subject to the constraints. Because the boundaries are smooth, we can use continuous analysis and approximate the number of choices by the volume within the feasibility region of the constraints.

There are two cases, θ≧1 and θ<1. In the former case, it is easy to verify that the constraints $\phi_{1.} \leq t/\theta$ and $\phi_{.1} \leq t/\theta$ are sufficient to yield a consistent 4-sided coin. The last constraint kicks in when θ<1. Simplifying notation, we need to find the area within the region bounded by x,y≧0 and x+y≦t+θ/t(xy), which evaluates to $$\int_0^t \frac{t-x}{1-(\theta/t)x}dx = \frac{t^2}{\theta}\left[1 + \frac{1-\theta}{\theta}\ln(1-\theta)\right] \quad (5)$$

We briefly discuss the computational problem of carrying the exact analysis over to larger itemsets. For k≧3, the θ-constraint in equation (4) or the volume evaluation in equation (5) cannot be written in closed form in general. In addition, numerical or Monte-Carlo integration may be too expensive. Now, piecewise constant θ segmentation will be described.

Given files of diverse length, it is not reasonable to compress them, compare the absolute sizes of the compressed files, and pick the largest one as most complex. The compression ratio would be a better indicator of complexity (large ratio of original to final size implies less complexity). Similarly, the code-length of various itemsets using the constant-θ segmentation are not directly comparable and a baseline code-length is needed for each itemset.

One option is to use the unconstrained code-length. It may be either smaller or larger than the constrained code-length. It can be larger in a 2-item situation, for example, when the unconstrained segmentation is induced mostly by sudden changes in only one marginal probability, but the value of θ is the same in all segments, so that the joint probability tracks these changes. The unconstrained segmentation will assign a new three-parameter coin to each of these segments. In contrast, the single-θ segmentation lucks out, paying only for two parameters per segment, and paying for θ only once. Conversely, the unconstrained code-length can be smaller if the constrained model was a poor fit to the data. Thus positive differences are interesting, and negative differences are not (but zero is not a very significant notch on this scale).

Another option for the baseline would be a piecewise constant θ segmentation. This is a relaxation of the single-θ model class. A piecewise constant θ model first specifies an outer segmentation of (0,T). Over each outer segment, it specifies a single value of θ. Then, for each outer segment, it specifies an inner segmentation, each assigned to one coin. All inner coins assigned to an outer segment have the same value of θ, the one associated with the outer segment. Finally, other necessary parameters for inner coins are specified as in the single θ case.

Finding a piecewise constant segmentation is simple given the previous building blocks. We set up a shortest path problem again. To assign the cost for edge (i,j), we run the constant θ segmentation algorithm on the (i,j) segment of the data. To avoid too many invocations of the constant θ procedure in practice, we can heuristically restrict potential segmentation points to those of the unconstrained segmentation. For efficiency and simplicity we use the unconstrained baseline in our experiments. Now, the method for discovering surprising temporal patterns in accordance with the invention will be described in more detail.

The building blocks of the method have now been described. Here, these blocks are put together to show an overall method of the system. We proceed from small to large itemsets as usual. However, because our surprise measure is conditioned on the marginals and on variation along time, we have to design pruning strategies different from the simple fixed support filtering commonly used in bottom-up itemset search algorithms (although any such minimum support can also be gainfully used). The method for one items and two or more items will now be briefly described with reference to FIGS. 5 and 6.

Figure 6:
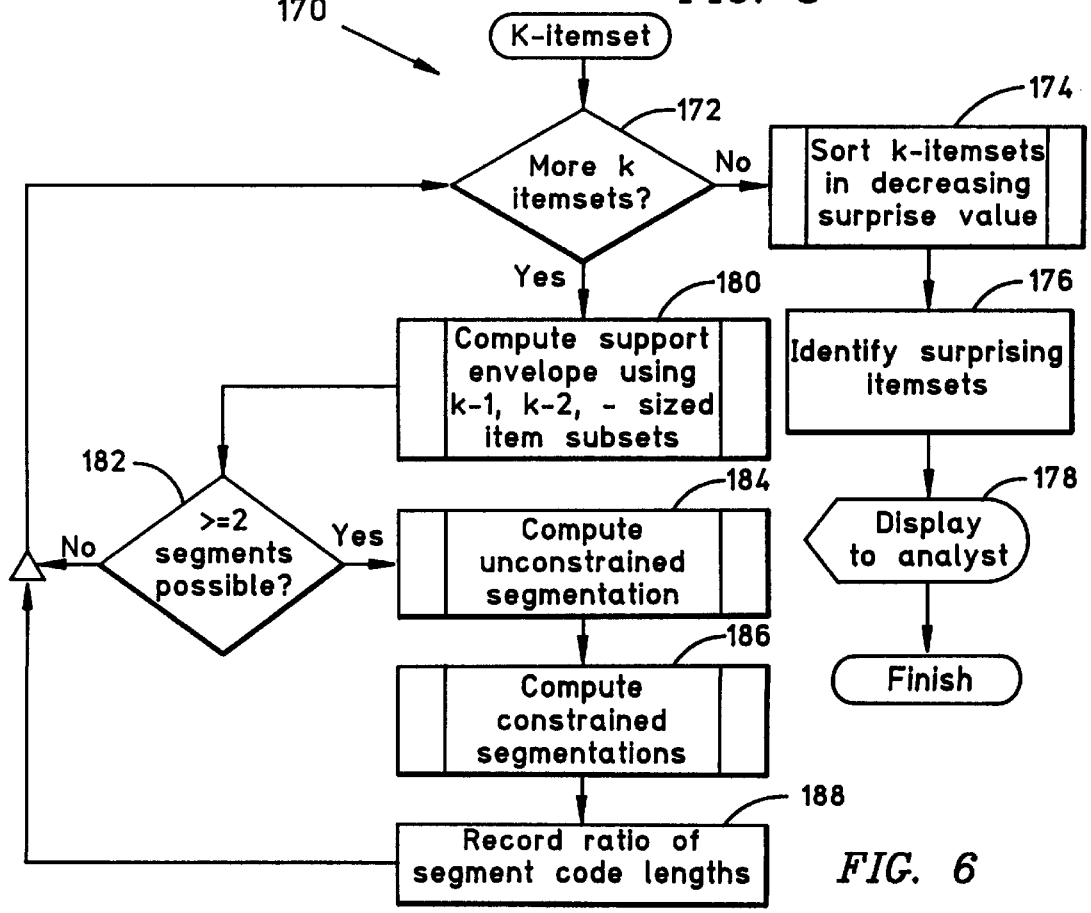
FIG. 6 is a flowchart illustrating a method for identifying surprising temporal patterns for itemsets containing two or more items in accordance with the invention.
Figure 5:
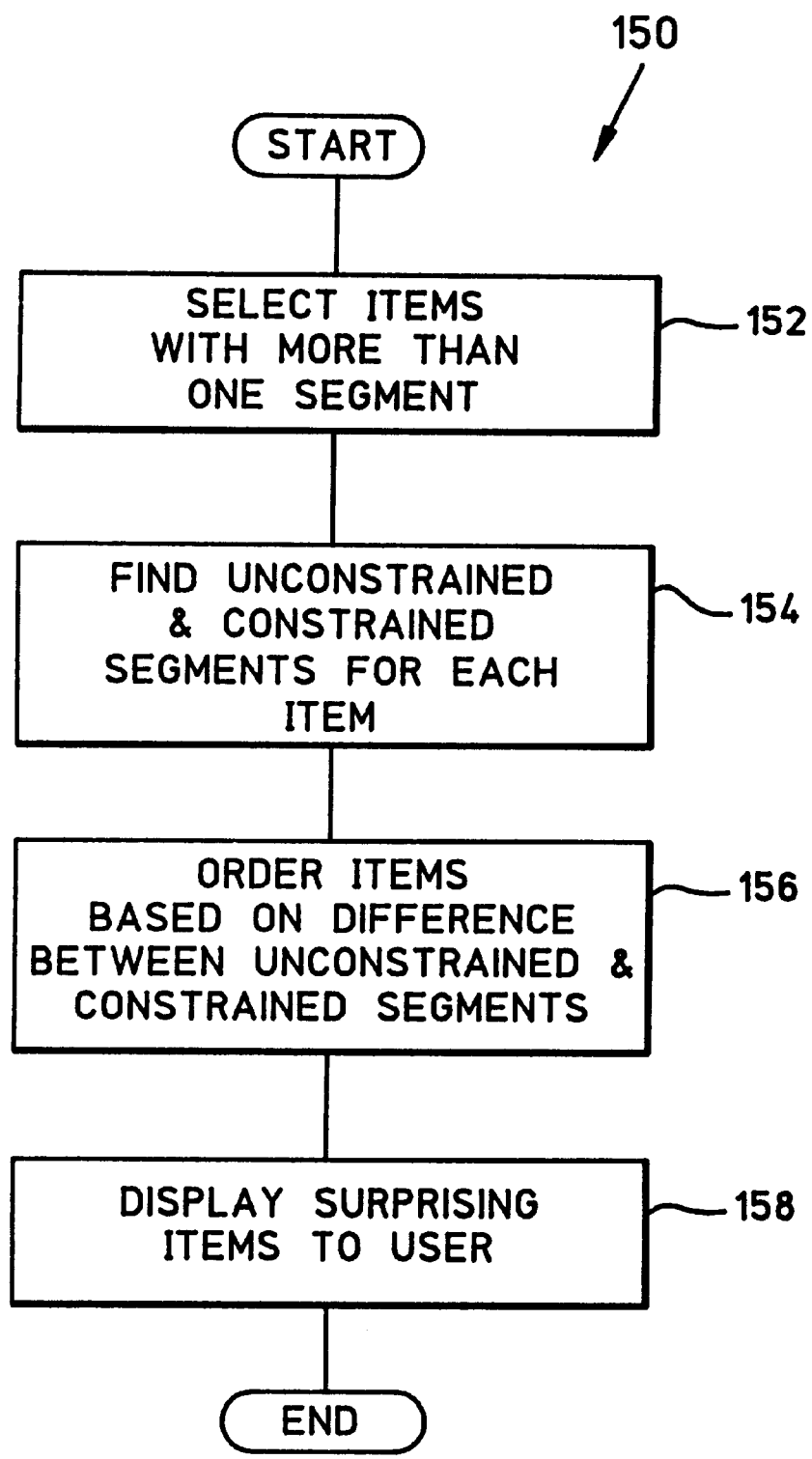
FIG. 5 is a flowchart illustrating a method for identifying surprising temporal patterns for itemsets containing one item in accordance with the invention.

FIG. 5 is a flowchart illustrating a method 150 for identifying surprising temporal patterns for itemsets containing one item in accordance with the invention while FIG. 6 is a flowchart illustrating a method 170 for identifying surprising temporal patterns for itemsets containing two or more items (k≧2) in accordance with the invention. As shown in FIG. 5, the method 150 begins at step 152 in which only those items that can possibly have more than one segment are selected. This is the pruning criterion which will be discussed below in more detail. Next, in step 154, the unconstrained segments and constrained segments for the single items are identified. Next, in step 156, the items are ordered by the difference, ratio, or relative differences between the code lengths. Finally, in step 158, the items are displayed to the user.

With reference to the method 170 shown in FIG. 6, in step 172, the system determines if there are more k itemsets. If there are no more k itemsets in the data, in step 174, the k-itemsets are sorted in decreasing surprise value order. Next, in steps 176 and 178, the surprising itemsets are identified and displayed to the user of the system and the method is completed.

If there are more k itemsets, then in step 180, a support envelope using k−1, k−2, ... sized item itemsets is determined. In step 182, the system determines if 2 or more segments are possible for the particular itemset. Itemsets which do not have possibly two or more segments are eliminated to prune the number of itemsets which are analyzed. This property of prunability is monotonic with respect to itemset containment, i.e., if an itemset can have at most one segment, no superset can have more. Thus, we can use subset-based pruning when it helps.

If it is possible to have two or more segments for a particular itemset, then in step 184, an unconstrained segmentation is computed as described above, a constrained segmentation is computer in step 186, and a ratio of the segment code lengths is determined in step 188. Once the ratio has been determined for the particular itemset, the method returns to step 172 and the method continues. Now, some computational performance enhancements are described.

To increase the computational performance of the method in accordance with the invention, pruning to control itemset expansion may be used, and a technique for determining near-optimal segmentations in near-linear time may be used. First, the pruning technique will be described.

We prune an itemset when its support sequence along time is so close to zero that it will not be possible to get more than one segment for any sequence that is enveloped by this sequence. This is superior to an absolute aggregated support based pruning because it can differentiate between the following two sequences both of which have the same aggregated support: One of the sequences has all the ones concentrated in one or two contiguous segments and another has the ones spread uniformly over the entire time base. Clearly, the former is more interesting than the latter. However, if for some economic reasons one is interested only in itemsets with support above a value, we can always include that as an additional filtering step.

This property, like the absolute support based pruning is also monotonic, meaning if an itemset is pruned all its supersets must also be pruned. Therefore, we can apply the "apriori" technique of pruning any itemsets with at least one subsets already pruned, during the candidate generation phase. In addition, we can also prune by looking at the estimated upper envelope on the support sequence of an itemset. This upper envelope is calculated during candidate generation by taking a minimum of the supports of each of the immediate subsets at each point in time. If this upper envelope meets the pruning criteria below, we drop the itemset. In particular, a sequence $\vec{x}$ of length n cannot be pruned if there is at least a fraction, f, of the sequence for which the estimate of coin bias, p, is large enough to satisfy $$p \log (1/f) > (\log n/nf) - (1-p) \log (1-p) + ((1/f)-p) \log (1-pf).$$

To prove this assertion, consider a sequence $\vec{y}$ that is enveloped by $\vec{x}$. The best case in which $\vec{y}$ can have two segments is when it is identical to $\vec{x}$ for some segment (i,j) in time and zero everywhere else. For such a sequence, find two coding costs: $C_1$ assuming the entire sequence is a single segment and $C_2$ assuming a separate segment for (i,j). $C_1$ has higher data encoding cost whereas $C_2$ has at least one extra segment and thus pays higher parameter and segmentation costs. These costs can be expressed in terms of f, p, n where f, p refer to the parameters of the sequence (i,j). We then use the inequality $C_1 > C_2$ to find the above condition. Now, a technique for fast shortest path approximations will be described.

The second important performance issue concerns the shortest path computation. This is a key subroutine in all our methods. For data mining applications with millions of transactions, it is clearly unacceptable to have quadratic complexity along time. In this section we will study how to arrest this quadratic growth and still get a good segmentation.

One immediate way to cut down running time is to pre-aggregate the data. In developing the algorithms, we have been dealing with each market basket as one reading of a random variable, but many data sets are pre-aggregated at daily or weekly levels. Given such data, it clearly makes no sense to segment finer than a day or week. In fact, if the input data is not aggregated at all, i.e. it is a 0–1 sequence, optimality is preserved in first taking run lengths of zeroes and ones. However, care may be needed to aggregate at coarser levels. Larger chunks will cut down running time but may gloss over narrow, interesting segments. Thus, a simple fixed size chunking and pre-aggregation, followed by a single shortest path computation, will not always achieve our goal.

To achieve the goal, suppose there are T transactions and thus T+1 nodes in the graph. Fix a constant $\epsilon$ between 0 and 1 to be decided later and break up the graph into $T^{1-\epsilon}$ chunks, each having $T^{\epsilon}$ nodes in it. Now, we solve $T^{1-\epsilon}$ instances of shortest path over the chunks, each taking $O(T^{2\epsilon})$ time, for a total time of $O(T^{1+\epsilon})$. Let the nodes on the shortest path in some chunk be called chosen. Heuristically, we hope that most chunks are completely contained within some global optimal segment, so that there are very few edges in the local shortest path for each chunk. If this is not the case, the chunk size is too large.

We now construct a sparsified version of the original graph. All T+1 nodes are there, but the only edges are those that go from one chosen node to another. If our heuristic assumption above holds, this graph has only $O(T^{1-\epsilon})$ chosen nodes and a final shortest path run on it takes $O(T^{2-2\epsilon})$ time. The total time is thus $O(T^{1+\epsilon}+T^{2-2\epsilon})$, which has the smallest value, $O(T^{4/3})$, for $\epsilon=\frac{1}{3}$, assuming, of course, that this choice yields a small number of chosen nodes. We finally report the shortest path found in the sparse graph. Now, a method for segmenting an itemset in accordance with the invention will be described in more detail.

Figure 7:
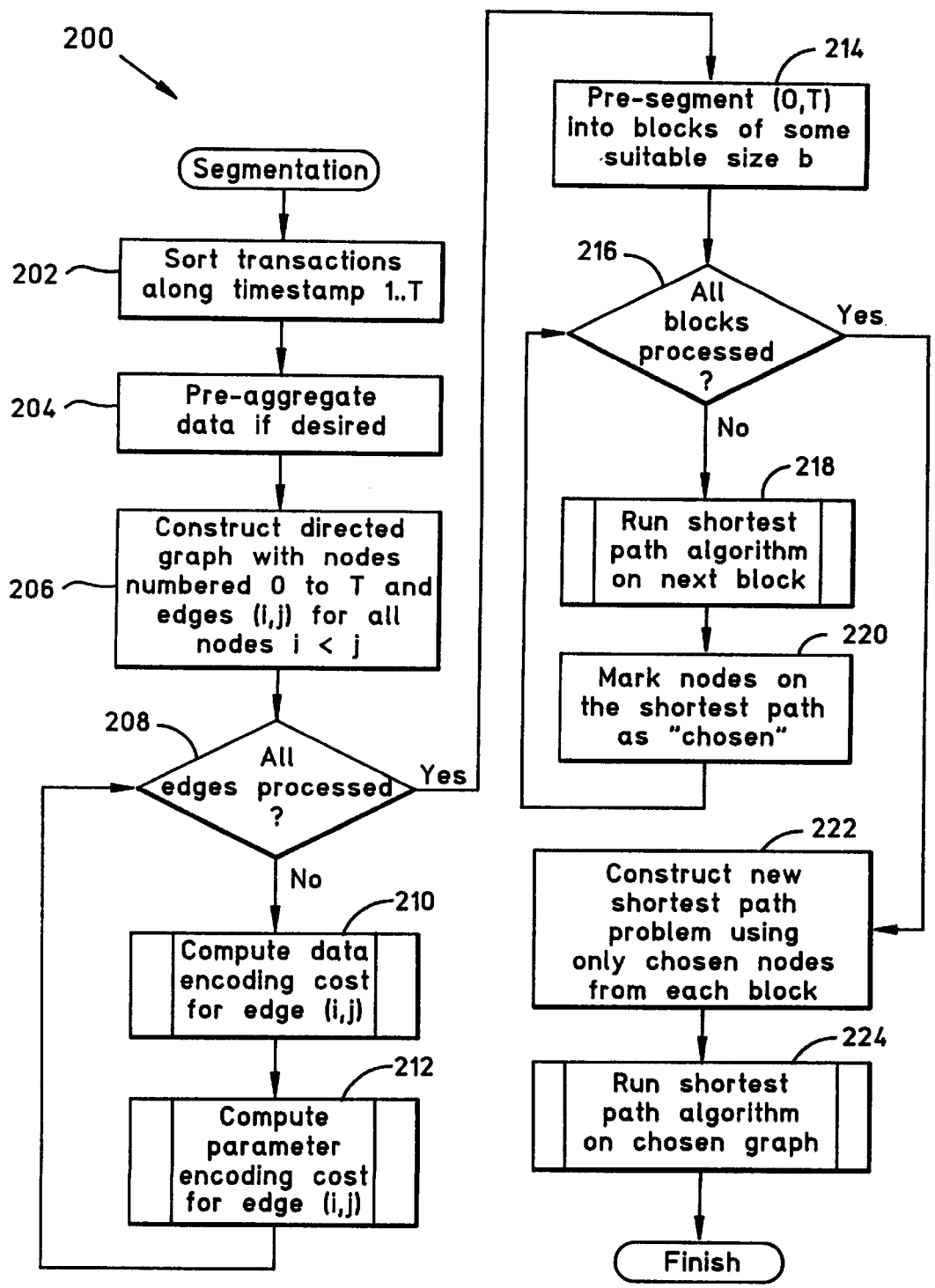
FIG. 7 is a flowchart illustrating a method for segmenting data in accordance with the invention.

FIG. 7 is a flowchart illustrating a method 200 for segmenting an itemset in accordance with the invention. In step 202, the transactions in the dataset or database are sorted along one or more timestamps (1, ..., T). Next, in step 204, the data may be pre-aggregated, as described above, if necessary. Next, in step 206, a directed graph is constructed with nodes numbered 0 to T and edges (i,j) for all nodes i<j. An example of such a graph is described below with reference to FIG. 8. In step 208, the system determines if all of the edges of the graph have been processed. If all of the edges have not been processed, then in steps 210 and 212, the data encoding costs, as described above, and the parameter encoding costs, as described above, are determined for edge (i,j). The method then loops back to step 208 and determines if there are any more edges to process. In this manner, all of the edges of the graph are processed (i.e., the data encoding and parameter encoding costs are determined).

Once all of the edges of the graph have been processed, the method, in step 214, pre-segments the period of time (0,T) into blocks of some predetermined, suitable size, b. Next, in step 216, the system determines if all of the blocks have been processed. If there are additional blocks to process, in step 218, a shortest path determination is executed on the next block. Then, in step 220, nodes on the shortest path are identified as "chosen". The method then loops back to step 216 to determine if all of the blocks have been processed. Thus, in this manner, all of the blocks are processed to determine shortest paths and nodes on the shortest paths are marked as "chosen".

If all of the blocks have been processed, then in step 222, a new shortest path problem is constructed using only the chosen nodes from each block. Next, in step 224, the shortest path determination is executed on the chosen graph generated in step 222. From this shortest path determination of the chosen graph, the shortest path is determined in accordance with the invention. This shortest path determination based on the chosen path provides an approximate segmentation in accordance with the invention which reduces the computational complexity of the method. Now, the approximate segmentation is compared to the optimal segmentation which was described above.

Figure 8:
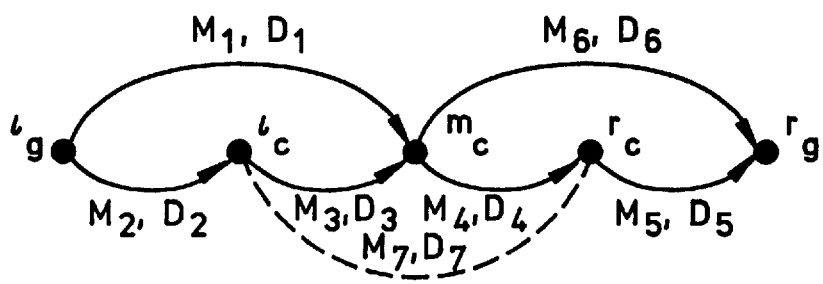
FIG. 8 illustrates a chunk of a graph.

Now, we determine what kind of quality the approximate segmentation has as compared to the optimal segmentation. The assertion is that the approximate shortest path has corresponding code length at most twice the optimal. To prove this, consider a chunk, c, having nodes as shown in FIG. 8, where the global optimal shortest path has edges $(l_g, m_c)$ and $(m_c, r_g)$, whereas the chunk's local shortest path skips from $l_c$ to $r_c$ avoiding $m_c$. (Note that $l_c$, $r_c$ are not necessarily the leftmost or rightmost nodes of c, $l_g$, $r_g$ could also belong to c, and some of these nodes could be one and the same.) Note the parameter and data encoding costs $M_1$ and $D_1$ through $M\tau$ and $D\tau$ in FIG. 7. Consider the total cost of the path $(l_g, l_c, r_c, r_g)$, which is less than the cost of the path $(l_g, l_c, m_c, r_c, r_g)$, because $(l_c, r_c)$ was preferred by the local shortest path to $(l_c, m_c, r_c)$. We will now compare $(l_g, m_c)$ in optimal with $(l_g, l_c, m_c,$ and $(m_c, r_g)$ in optimal with $(m_c, r_c, r_g)$.

For all edges, the global segmentation cost is the same, $S=\log T$. Let $M_1$, $D_1$ be the parameter and data costs for $(l_g, m_c)$ in optimal, and $M_2$, $D_2$; $M_3$, $D_3$ be the maximum likelihood model and data costs for $(l_g, l_c)$ and $(l_c, m_c)$ respectively. Then observe that $D_2+D_3 \leq D_1$, and $M_2+M_3 \leq 2M_1$. This is because $D_2$ and $D_3$ are ML estimates. Similarly, $D_4+D_5 \leq D_6$ and $M_4+M_5 \leq 2M_6$. Thus we have to compare between $2S+(M_1+D_1)+(M_6+D_6)$ (cost of the optimal) and $4S+(M_2+D_2+M_3+D_3)+(M_4+D_4+M_5+D_5)$ (cost of approximate). The approximate cost is most $2S+M_1+M_6$ larger. Since optimal is at least $2S+M_1+M_6$ large, this is a factor of at most 2.

Consider how the optimal path may interact with a given chunk c. It may never touch any node in c, in which case there is nothing to do. If it does, it enters at some node and leaves at another (perhaps the same) node. If these nodes are not chosen, we can make the adjustment above to construct a path passing through only chosen nodes that has at most two times the optimal cost. In practice, if is small enough, the optimal path avoids most chunks and so the cost increase is quite negligible, less than 0.2 in our experiments. It is roughly proportional to the number of hops in the optimal path. Now, examples of test results using the system and method in accordance with the invention will be described.

Real-life market basket data was studied over several years. In particular, Dataset-A consisted of 2.8 million transactions spanning over seven years from 1987 to 1993. The time stamps with each transaction was recorded to a granularity of a day. Therefore, each sequence was of length at most 2590. There were 15.8 thousand total number of items and the average length of a transaction was 2.62. DataSet-B consisted of 1.65 million transactions spanning over a period of three years from 1991 to 1993. Here again, the recording granularity was a day yielding a total of 1092 time points for each item sequence. There were a total of 69 thousand items and the average length of a transaction was 1.6. First the performance of the method will be described and then the quality of the output of the method will be described.

Figure 9A:
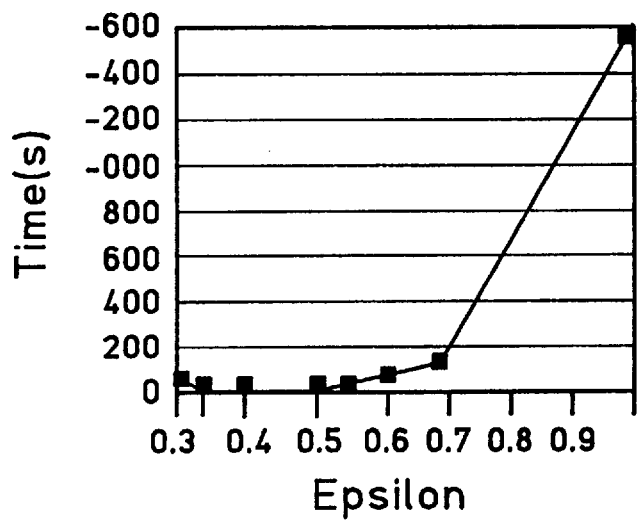
FIGS. 9A and 9B are graphs illustrating how the fast approximation can cut down the time for the shortest path computation.
Figure 9B:
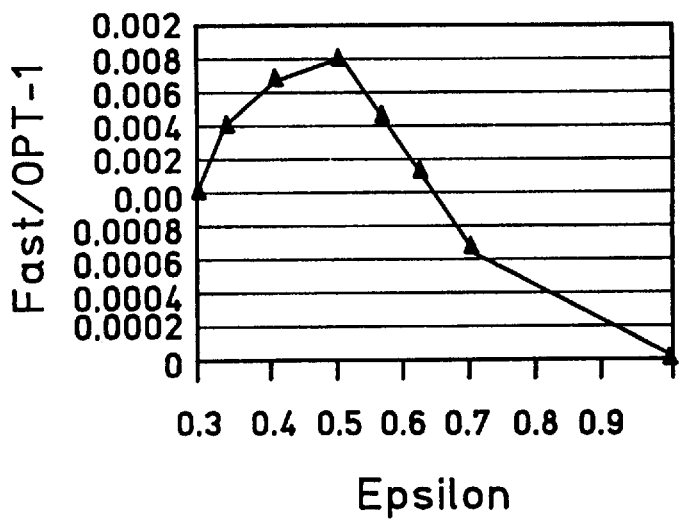

The apparent complexity of our data analyses may evoke questions about practicality. Actually, our method works within very reasonable time. The main potential complexity was in the shortest path computation. This was significantly mitigated by our fast shortest path heuristic. FIGS. 9A and 9B show how the fast approximation can cut down the time for shortest path computation. Specifically, we study the effect of $\epsilon$ between ⅓ and 1. First consider the plot of running time against $\epsilon$. It is evident that for a broad range of $\epsilon$, the time taken by the approximate algorithm is smaller than that of the optimal algorithm by more than an order of magnitude. It is not monotonic: there is a small valley near 0.4. At small $\epsilon$, there are many chunks but almost never more than two chosen nodes per chunk, i.e. their endpoints. Most of the work is in the final phase. At larger $\epsilon$, there are larger, fewer chunks; there is more work in the first phase, and perhaps more chosen nodes in the second phase.

Next consider the plot of error against $\epsilon$. We plot the ratio of approximate bits to optimal bits minus one. The big message is that the error is tiny, less than 0.2% typically. Error also shows non-monotonicity. At small $\epsilon$, MDL is extremely unwilling to posit more than one coin per chunk, but this is OK since tiny chunks are unlikely to straddle optimal segment boundaries. As chunk size increases, MDL maintains this stand for some time even as errors accumulate because of straddling. Eventually, MDL gives in and increases chosen nodes, at which point the final phase picks up good paths again. Summarizing, the fast heuristic enables our analysis to execute within reasonable time without losing accuracy. Now, the quality of the output of the method will be described.

The quality of the output of the method in accordance with the invention will be compared with that of simpler or previously known alternatives. For purposes of this description [MDL:] denotes the method in accordance with the invention. [Stat:] denotes a standard statistical approach where data is first aggregated to some level of granularity (a week by default in our experiments). For each such regular segment, we measure the value and find the spread (ratio of standard deviation and mean) of θ over all the segments. We order itemsets based on this measure. We experimented with four other measures of interest: standard deviation of θ, spread of chi-squared values, spread and standard deviation of p-values. We report comparisons with only the spread of θ measure since it showed the best overall results. [MDL-Stat:] denotes a hybrid of the two methods. A shortcoming of the above method is that users need to specify a fixed window size to segment the sequence. The MDL-based method can find the best segmentation automatically. Therefore, we test a hybrid of the two methods above where we first use the MDL approach to get the best segmentation (by solving the unconstrained segmentation problem). Next, we order itemsets on the spread of the between segments as in the statistical approach.

We now present three kinds of evaluation. First, we present anecdotal evidence that the top sets output by our method are more interesting than those from the alternatives, and explain why this is the case. Next we undertake a more quantitative evaluation. We consider the top items found interesting by our method and find their positions in the itemset orderings of the alternative methods. We call this the rank-order evaluation. Then, we evaluate the sharpness or selectivity of the different approaches. We consider what fraction of the total itemsets have "high" values of the interest measure. Intuitively, a method where a very small number of itemsets have high values of the interest measure is better than another where the high interest values are spread over large number of itemsets making it harder to define a sharp cut-off. We call this the selectivity evaluation. For these comparisons we consider itemsets of size two; in our experiments with these large datasets we have not found any 3-itemset which is surprising given the marginals of item subsets.

Figure 10A:
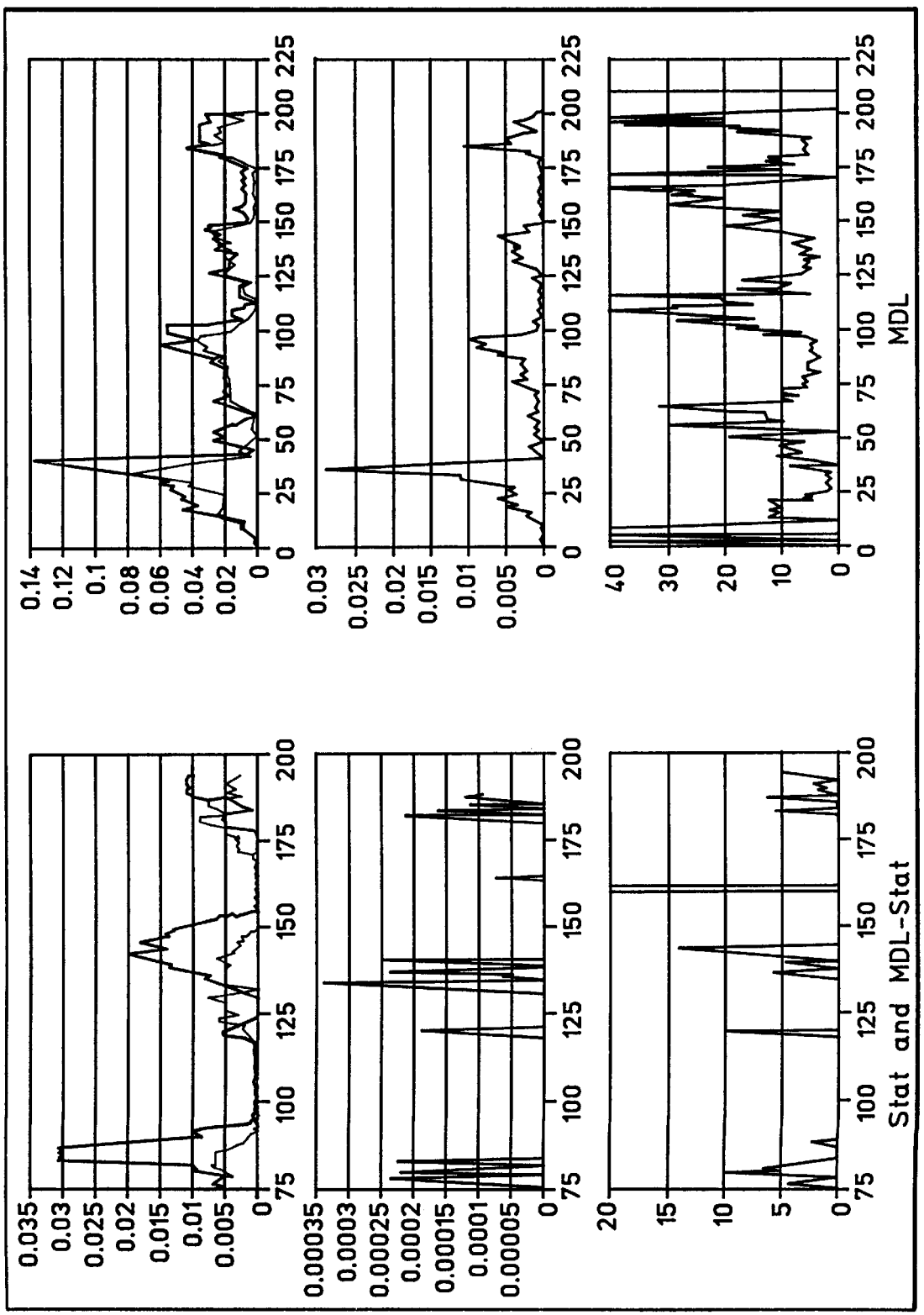
FIG. 10 is a diagram showing various graphs with the results of the method in accordance with the invention and other conventional methods.
Figure 10B:
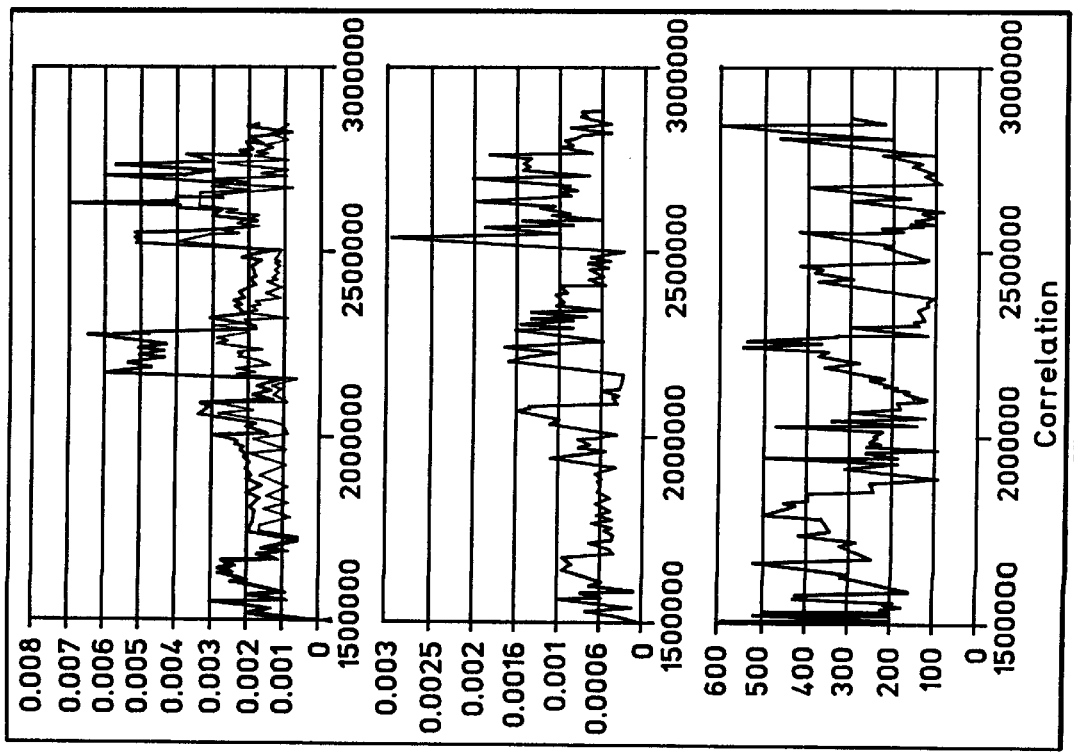

First, the anecdotal evidence. In FIG. 10, we show various sequences for three pairs of itemsets. In FIG. 9, the x-axis shows time, the top row of graphs show marginals $p_1$ and $p_{-1}$ averaged over a weekly window from each method (MDL, Correlation and MDL-Stat), the middle row shows the support $p_{11}$ of both items in a basket for each method and the bottom row shows the θ values for each method. The first itemset (first column) was ranked very high by the method and the methods but was not found interesting by MDL. The second item pair was ranked high by MDL but was ranked very low by all of the other approaches (did not appear in the top several hundred, or 10%, of their ranked list) and the final itemset (third column) was ranked high by but was not found interesting by MDL.

A quick look shows that θ fluctuates a fair amount for each of the three cases. That is normal. We want to separate statistically significant fluctuations from random noise. A closer look at these sequences shows these differences.

Consider the itemset that was found near the top of the Stat and the MDL-Stat list but was found uninteresting by MDL (first column). The spread of the θ values is high for this sequence because of the high peaks of θ caused due to small support of the marginals. The MDL-based approach is robust to such small marginals since these end up having small code lengths. The items turned out to be complementary: polo shirt and shorts.

Now, consider the itemset that was picked as interesting by MDL but was ranked low by the other two methods (second column). Once we ignore short range noise in θ, we notice that it increases from 2 (almost independent) to around 17 over a steady range. The change happens gradually with the result that the deviation-based measures do not find this interesting. The items were men's and women's shorts. These do not have complementary roles and there is no obvious reason why dependence between these two items should increase with time, and yet the pattern is statistically significant. We are therefore justified in regarding this as a surprising pattern.

For the itemset that was ranked high based on Correlation but not by MDL, we observe that θ fluctuates around a large constant mean of 250, but the fluctuation is small relative to 250, compared to the MDL topper. The item pair turned out to be bedsheets and pillow-cases, which people routinely buy together.

As far as the user is concerned, an exact measure of complexity of itemset sequences is less important than the ordering it imposes on itemsets. In a typical application, we envision that the user will be shown ranked lists of the most surprising itemsets (by some measure) from single to double to larger itemsets which are not explained by smaller itemsets shown earlier in the list. Accordingly, in this section, we will compare the rankings computed using the various suggested approaches.

Figure 11A:
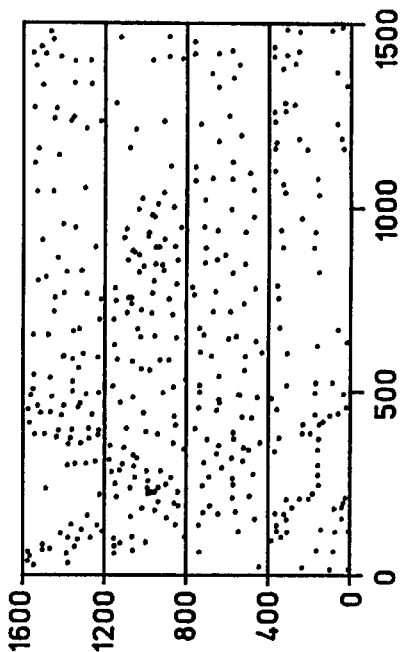
FIGS. 11A and 11B are graphs illustrating the ranks assigned by the method in accordance with the invention against the rank assigned by the conventional methods.
Figure 11B:
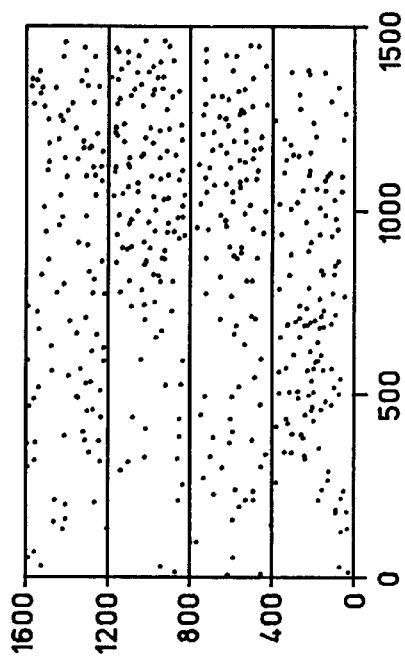

In the graphs in FIGS. 11A and 11B, we plot the ranks assigned by MDL (y-axis) against the rank assigned by the Stat and Stat-MDL methods (x-axis). (To reduce clutter a random collection of 500 itemset pairs are plotted.) First note that there is no strong correlation between the MDL and the Stat method. The correlation coefficient (over all itemset pairs) is 0.02 which is practically close to zero. With better segmentation using the MDL-Stat method, the correlation improves from 0.02 to 0.08 as shown by the second figure but the correlation is still not strong enough for the method to be a substitute for MDL. For instance, on zooming to the 100 by 100 grid near the origin we find that only 11 of the top 100 itemsets in the MDL list occur in the top-100 MDL-Stat list.

Figure 12:
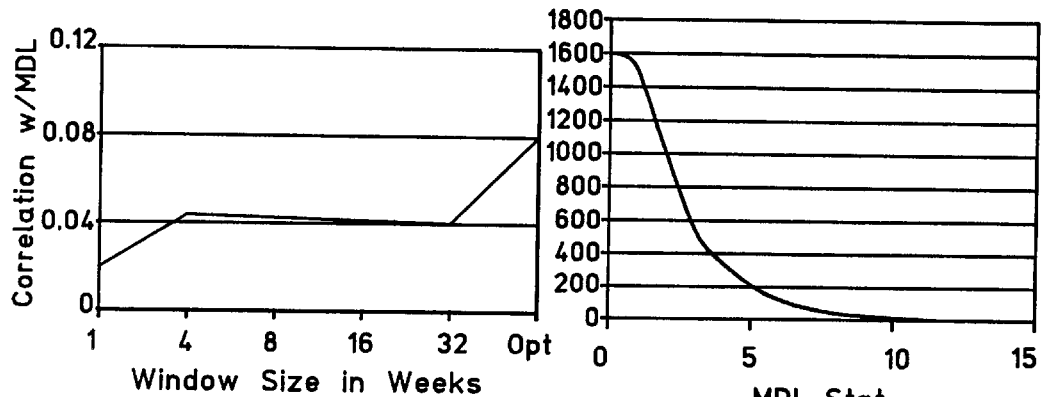
FIG. 12 is a graph illustrating the correlation between the method for different values of periodicity; and In FIGS. 13A–13D are graphs comparing the interest measure for the method in accordance with the invention and the other conventional methods.
Figure 13B:
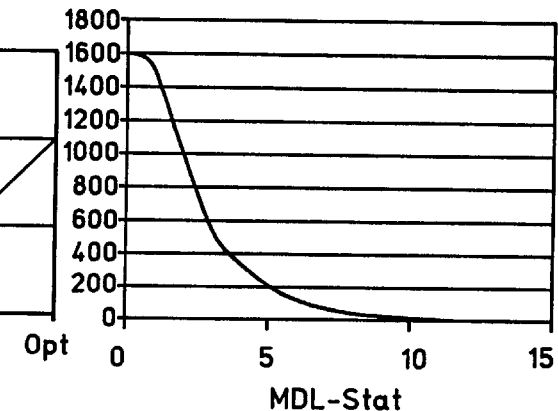
Figure 13C:
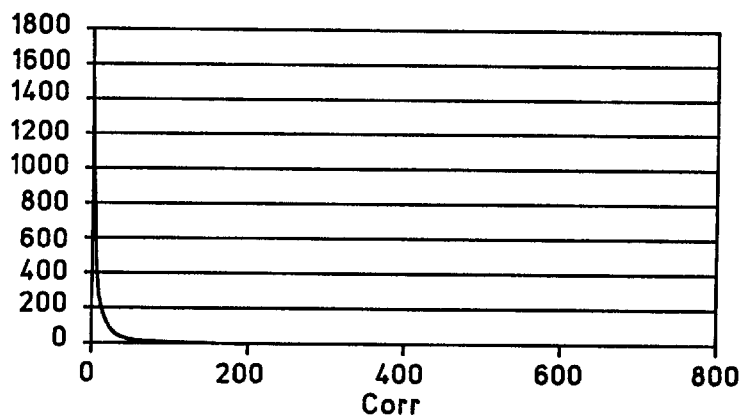
Figure 13A:
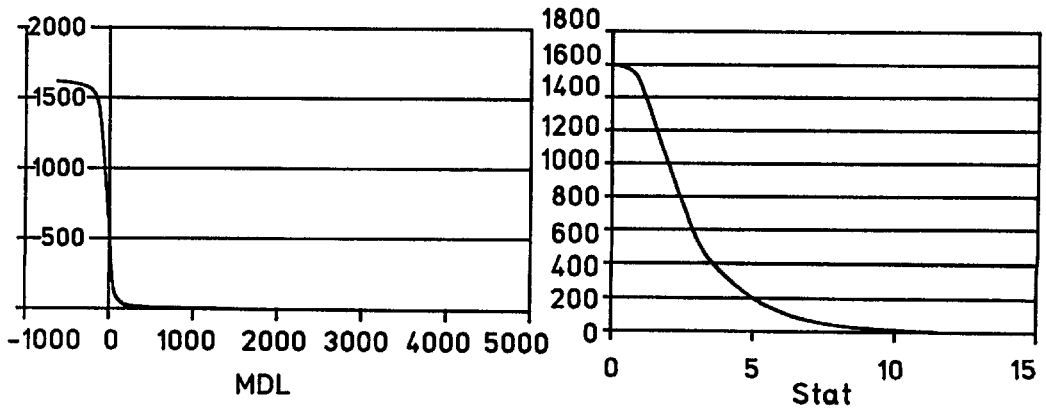
Figure 13D:
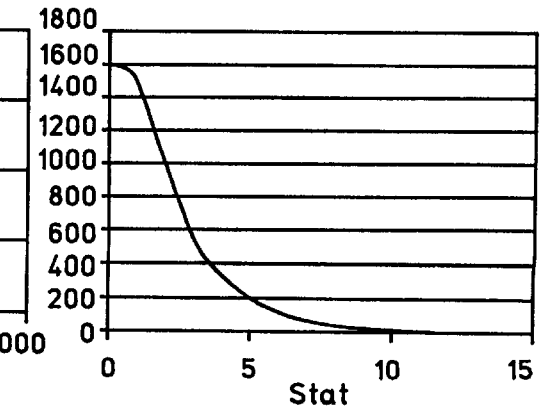

Another potential problem with the conventional Stat approach is coming up with a good window size over which to compute θ. To show the sensitivity of the result to this parameter in FIG. 12, we show the correlation between the method for different values of periodicity with the MDL method. As we increase the window size from 1 week to 4 weeks the correlation with MDL increases but then drop slightly as we increase the window size further. The best correlation is achieved when we use MDL to find the best segmentation as indicated by the extreme point marked "Opt".

We give a measure of the selectivity of the different methods in filtering interesting itemsets from the rest. This is related to the sharpness with which the count of the number of itemsets with interest above a threshold falls. In FIGS. 13A–13D, we compare this measure for different methods. The x-axis shows the interest measure used by the method and the y-axis shows the count of the number of itemsets above a given interest value. Note that the sharpest gradient is obtained by the MDL method. Out of a total of 1600 itemsets, less than 50 have interest measure greater than zero. The number is significantly higher for the other three methods.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A method for identifying unexpected temporal patterns in a dataset containing a plurality of transactions, each transaction containing one or more items with a time-stamp, the one or more items being grouped into itemsets containing a pattern of items, the method comprising:

generating one or more support values at predetermined times for each pattern, each support value indicating a portion of the transactions in the dataset containing each-such pattern at a predetermined time;

selecting unexpected patterns from the dataset which have a support value at a predetermined time that is higher than a predetermined threshold value; and identifying an unexpected temporal pattern from the selected unexpected patterns, the unexpected temporal pattern having support values over a predetermined time period which change more than a second predetermined threshold value.

2. The method of claim 1 wherein the generation of one or more support values at predetermined times for each pattern includes encoding a sequence of items in a coding scheme where it is inexpensive to encode sequences that have a well-known correlation between items, and expensive to encode sequences with unexpected patterns.

3. The method of claim 2 wherein the selection of unexpected patterns from the dataset includes selecting expensively coded sequences.

4. The method of claim 3 wherein an expensively encoded support value sequence includes a sequence of a first number of bits, and wherein an inexpensively encoded support value includes a sequence of a second number of bits, less than the first number; and wherein the selection of unexpected patterns includes selecting a support value with the first number of bits.

5. The method of claim 1 wherein identifying an unexpected temporal pattern from the selected unexpected patterns includes the second predetermined threshold value being formulated in a minimum description length (MDL) to determine the change in surprise over time.

6. The method of claim 5 wherein a first description length indicates a pattern which changes over time, and a second description length, shorter than the first description length, indicates a pattern that does not change over time.

7. The method of claim 1 further comprising:

following the identification of unexpected temporal patterns, determining if the additional temporal patterns are to be identified;

incrementing the first predetermined threshold; and reselecting unexpected patterns from the dataset which have a support value at a predetermined time that is higher than the incremented threshold value.

8. The method of claim 1 in which the itemsets are scored by the set of items in the itemset, and the method further comprising:

offsetting the score of a set of items by unexpected temporal patterns that are already known.

9. A method for identifying unexpected temporal patterns in a dataset containing a plurality of transactions, each transaction containing one or more time-stamped items, the one or more items being grouped into itemsets having a pattern of items, the method comprising:

generating a support value at a predetermined time for each pattern indicating the portion of the transactions in the dataset containing the pattern of items at the predetermined time;

selecting candidate patterns from the dataset based on the variations in the support value of the pattern over a predetermined time period;

generating an unconstrained description length for each candidate pattern, the unconstrained description length corresponding to a value indicating changes in the support of the pattern over the predetermined time period;

generating a constrained description length for each candidate pattern, the constrained description length corresponding to a compressed value indicating the changes in the support of the pattern over the predetermined time period; and identifying patterns, based on a comparison of the unconstrained description length and the constrained description length, which have a unexpected support value which changes during the predetermined time period to generate unexpected temporal patterns.

10. The method of claim 9 wherein the generation of an unconstrained description length for each candidate pattern includes modeling support values as fixed length segments; and the method further comprising:

forming a weighted graph to discover the segments lengths by reducing the description length to the shortest path.

11. The method of claim 10 wherein the generation of a constrained description length for each candidate pattern includes restricting the support value model to have the same value of surprise over all the segments.

12. The method of claim 9 wherein the identification of patterns based on a comparison of the unconstrained description length and the constrained description length includes:

forming a ration of the unconstrained segment length to the constrained segment lengths;

if the ratio between the unconstrained and restrained segments is large, identifying the pattern as a surprising pattern; and if the ratio between the unconstrained and restrained segments is not large, identifying the pattern as an unsurprising pattern.

13. The method of claim 9 wherein the generation of a support value at a predetermined time includes encoding a sequence of items in a coding scheme where it is inexpensive to encode sequences that have a well-known correlation between items, and expensive to encode sequences with unexpected patterns.

14. The method of claim 13 in which the selection of candidate patterns from the dataset based on the variations in the support value of the pattern over a predetermined time period includes selecting expensively coded sequences.

15. The method of claim 14 wherein the identification of patterns includes ordering items by the difference, ratio, and relative difference between segment lengths.

16. The method of claim 9 wherein the identification of patterns, based on a comparison of the unconstrained description length and the constrained description length includes the difference between the unconstrained and constrained description lengths corresponding to the unexpectedness of a temporal pattern.

17. A computer system for data mining unexpected temporal patterns, the system comprising:

a data storage medium to store a database of a plurality of transactions, each transaction containing one or more time-stamped items, the one or more items being grouped into itemsets having a pattern of items;

an output module to output the identity of the surprising temporal patterns; and an operating system stored in a computer readable medium with a surprising temporal identifier kernel, which accesses the data storage database, to execute a series of machine-executable instructions that identify surprising temporal patterns as follows:

generating one or more support values at predetermined times for each pattern, each support value indicating a portion of the transactions in the dataset containing each such pattern at a predetermined time;

selecting unexpected patterns from the dataset which have a support value at a predetermined time that is higher than a predetermined threshold value; and identifying an unexpected temporal pattern from the selected unexpected patterns, the unexpected temporal pattern having support values over a predetermined time period which change more than a second predetermined threshold value.

18. The system of claim 17 wherein the generation of one or more support values at predetermined times for each pattern includes encoding a sequence of items in a coding scheme where it is inexpensive to encode sequences that have a well-known correlation between items, and expensive to encode sequences with unexpected patterns.

19. The system of claim 18 wherein the selection of unexpected patterns from the dataset includes selecting expensively coded sequences.

20. The system of claim 19 wherein an expensively encoded support value sequence includes a sequence of a first number of bits, and wherein an inexpensively encoded support value includes a sequence of a second number of bits, less than the first number; and wherein the selection of unexpected patterns includes selecting a support value with the first number of bits.

21. The system of claim 17 wherein identifying an unexpected temporal pattern from the selected unexpected patterns includes the second predetermined threshold value being formulated in a minimum description length (MDL) to determine the change in surprise over time.

22. The system of claim 21 wherein a first description length indicates a pattern which changes over time, and a second description length, shorter than the first description length, indicates a pattern that does not change over time.

23. The system of claim 17 in which the machine-executable instructions further include:

following the identification of unexpected temporal patterns, determining if the additional temporal patterns are to be identified;

incrementing the first predetermined threshold; and reselecting unexpected patterns from the dataset which have a support value at a predetermined time that is higher than the incremented threshold value.

24. The system of claim 17 in which the itemsets are scored by the set of items in the itemset, and the machine-executable instructions further include:

offsetting the score of the set of items by unexpected temporal patterns that are already known.

25. A computer system for data mining unexpected temporal patterns, the system comprising:

a data storage medium to store a database of a plurality of transactions, each transaction containing one or more time-stamped items, the one or more items being grouped into itemsets having a pattern of items;

an output module to output the identity of the surprising temporal patterns; and an operating system stored in a computer readable medium with a surprising temporal identifier kernel, which accesses the data storage database, to execute a series of machine-executable instructions that identify surprising temporal patterns as follows:

generating a support value at a predetermined time for each pattern indicating the portion of the transactions in the dataset containing the pattern of items at the predetermined time;

selecting candidate patterns from the dataset based on the variations in the support value of the pattern over a predetermined time period;

generating an unconstrained description length for each candidate pattern, the unconstrained description length corresponding to a value indicating changes in the support of the pattern over the predetermined time period;

generating a constrained description length for each candidate pattern, the constrained description length corresponding to a compressed value indicating the changes in the support of the pattern over the predetermined time period; and identifying patterns, based on a comparison of the unconstrained description length and the constrained description length, which have a unexpected support value which changes during the predetermined time period to generate unexpected temporal patterns.

26. The system of claim 25 wherein the generation of an unconstrained description length for each candidate pattern includes modeling support values as fixed length segments; and the surprising temporal identifier kernel executing further machine-executable instructions as follow:

forming a weighted graph to discover the segments lengths by reducing the description length to the shortest path.

27. The system of claim 26 wherein the generation of a constrained description length for each candidate pattern includes restricting the support value model to have the same value of surprise over all the segments.

28. The system of claim 25 wherein the identification of patterns based on a comparison of the unconstrained description length and the constrained description length includes:

forming a ration of the unconstrained segment length to the constrained segment lengths;

if the ratio between the unconstrained and restrained segments is large, identifying the pattern as a surprising pattern; and if the ratio between the unconstrained and restrained segments is not large, identifying the pattern as an unsurprising pattern.

29. The system of claim 25 wherein the generation of a support value at a predetermined time includes encoding a sequence of items in a coding scheme where it is inexpensive to encode sequences that have a well-known correlation between items, and expensive to encode sequences with unexpected patterns.

30. The system of claim 29 in which the selection of candidate patterns from the dataset based on the variations in the support value of the pattern over a predetermined time period includes selecting expensively coded sequences.

31. The system of claim 30 wherein the identification of patterns includes ordering items by the difference, ratio, and relative difference between segment lengths.

32. The system of claim 25 wherein the identification of patterns, based on a comparison of the unconstrained description length and the constrained description length includes the difference between the unconstrained and constrained description lengths corresponding to the unexpectedness of a temporal pattern.

33. A computer system for data mining unexpected temporal patterns, the system comprising:
a client computer including:
an operating system stored in a computer readable medium with a surprising temporal identifier kernel to execute a series of machine-executable instructions that identify surprising temporal patterns;
an output module to output the identity of the surprising temporal patterns; and a server computer including:
a processor;
a data storage medium to store a database of a plurality of transactions, each transaction containing one or more time-stamped items, the one or more items being grouped into itemsets having a pattern of items;
an operating system stored in a computer readable medium with a surprising temporal identifier kernel, which accesses the data storage database, to execute a series of machine-executable instructions which identify surprising temporal patterns; and wherein the surprising temporal identifier kernel executes instructions as follows:
generating one or more support values at predetermined times for each pattern, each support value indicating a portion of the transactions in the dataset containing each such pattern at a predetermined time;
selecting unexpected patterns from the dataset which have a support value at a predetermined time that is higher than a predetermined threshold value; and
identifying an unexpected temporal pattern from the selected unexpected patterns, the unexpected temporal pattern having support values over a predetermined time period which change more than a second predetermined threshold value.

34. The system of claim 33 wherein the server computer is selected from the group including IBM RS/6000 250 workstations, Unix computers, OS/2 servers, and Windows NT servers.

35. The system of claim 33 wherein the server computer operating system is an AIX 3.2.5 operating system.

36. The system of claim 33 wherein the server computer database is selected from the group including DB2, ORACLE, disk drive, and tape drive.

37. The system of claim 33 wherein the machine-executable instructions reside in storage media selected from the group including RAM, floppy disk, DASD array, magnetic tape, and hard disk drive, ROM, and optical storage disk.

38. The system of claim 33 wherein the machine-executable instructions are compiled in C++ language code.

39. A computer system for data mining unexpected temporal patterns, the system comprising:
a client computer including:
an operating system stored in a computer readable medium with a surprising temporal identifier kernel to execute a series of machine-executable instructions which identify surprising temporal patterns;
an output module to output the identity of the surprising temporal patterns; and a server computer including:
a processor;
a data storage medium to store a database of a plurality of transactions, each transaction containing one or more time-stamped items, the one or more items being grouped into itemsets having a pattern of items;
an operating system stored in a computer readable medium with a surprising temporal identifier kernel, which accesses the data storage database, to execute a series of machine-executable instructions that identify surprising temporal patterns; and
wherein the surprising temporal identifier kernel executes instructions as follows:
generating a support value at a predetermined time for each pattern indicating the portion of the transactions in the dataset containing the pattern of items at the predetermined time;
selecting candidate patterns from the dataset based on the variations in the support value of the pattern over a predetermined time period;
generating an unconstrained description length for each candidate pattern, the unconstrained description length corresponding to a value indicating changes in the support of the pattern over the predetermined time period;
generating a constrained description length for each candidate pattern, the constrained description length corresponding to a compressed value indicating the changes in the support of the pattern over the predetermined time period; and
identifying patterns, based on a comparison of the unconstrained description length and the constrained description length, which have a unexpected support value which changes during the predetermined time period to generate unexpected temporal patterns.

40. The system of claim 39 wherein the server computer is selected from the group including IBM RS/6000 250 workstations, Unix computers, OS/2 servers, and Windows NT servers.

41. The system of claim 39 wherein the server computer operating system is an AIX 3.2.5 operating system.

42. The system of claim 39 wherein the server computer database is selected from the group including DB2, ORACLE, disk drive, and tape drive.

43. The system of claim 39 wherein the machine-executable instructions reside in storage media selected from the group including RAM, floppy disk, DASD array, magnetic tape, and hard disk drive, ROM, and optical storage disk.

44. The system of claim 39 wherein the machine-executable instructions are compiled in C++ language code.

* * * * *

UNITED STATES PATENT AND TRADEMARK OFFICE
CERTIFICATE OF CORRECTION

PATENT NO.:     6,189,005
DATED:          February 13, 2001
INVENTORS:      Chakrabarti et al.

It is certified that an error appears in the above-identified patent and that said Letters Patent is hereby corrected as shown below:

Column 1, line 58, change "Modem" to --Modern--;

Column 2, line 56, add "A" in front of the word key;

Column 11, line 2, change "O<i<j<T" to --$O \le i < j \le T$--;

Column 11, line 67, change "$(t+1)^2 \approx 2\log t$" to --$(t+1)^2 \approx 2\log t$--;

Column 14, equation #(3), change "$h_1$" to --$h_{.1}$ --;

Signed and Sealed this

Twenty-ninth Day of May, 2001

Attest:

NICHOLAS P. GODICI

Attesting Officer      Acting Director of the United States Patent and Trademark Office